US007590860B2

(12) United States Patent
Leporini et al.

(10) Patent No.: US 7,590,860 B2
(45) Date of Patent: Sep. 15, 2009

(54) SECURE DATA PROCESSING APPARATUS

(75) Inventors: David Leporini, Rungis (FR); Michel Angel, Paris (FR); Jean-Bernard Beuque, Bois Colombes (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 851 days.

(21) Appl. No.: 10/295,021

(22) Filed: Nov. 14, 2002

(65) Prior Publication Data
US 2003/0110382 A1 Jun. 12, 2003

(30) Foreign Application Priority Data
Dec. 12, 2001 (EP) .................................. 01403228

(51) Int. Cl.
*H04L 9/00* (2006.01)
(52) U.S. Cl. .................. 713/185; 713/150; 713/172; 726/26; 725/31; 380/200; 380/201
(58) Field of Classification Search ................ 713/172, 713/193, 194, 168, 150, 192, 164, 185; 380/229, 380/30, 44, 201, 231, 200; 725/25, 31, 62; 726/26, 27
See application file for complete search history.

(56) References Cited

U.S. PATENT DOCUMENTS

| 6,035,037 | A | * | 3/2000 | Chaney | 380/227 |
|---|---|---|---|---|---|
| 6,101,255 | A | * | 8/2000 | Harrison et al. | 380/52 |
| 6,105,134 | A | * | 8/2000 | Pinder et al. | 713/170 |
| 6,157,719 | A | * | 12/2000 | Wasilewski et al. | 380/210 |
| 6,178,242 | B1 | * | 1/2001 | Tsuria | 380/201 |
| 6,243,469 | B1 | * | 6/2001 | Kataoka et al. | 380/255 |
| 6,289,455 | B1 | * | 9/2001 | Kocher et al. | 713/194 |
| 6,422,460 | B1 | * | 7/2002 | Boesch | 235/380 |
| 6,463,152 | B1 | * | 10/2002 | Takahashi | 380/201 |
| 6,532,539 | B1 | * | 3/2003 | Campinos et al. | 713/150 |
| 6,650,710 | B1 | * | 11/2003 | Hamery et al. | 375/240.29 |
| 6,651,250 | B1 | * | 11/2003 | Takai | 725/31 |
| 6,671,881 | B1 | * | 12/2003 | Tamer et al. | 725/31 |
| 6,697,489 | B1 | * | 2/2004 | Candelore | 380/200 |
| 6,714,650 | B1 | * | 3/2004 | Maillard et al. | 380/231 |
| 6,810,387 | B1 | * | 10/2004 | Yim | 705/57 |
| 6,853,728 | B1 | * | 2/2005 | Kahn et al. | 380/239 |
| 6,912,513 | B1 | * | 6/2005 | Candelore | 705/51 |
| 6,987,854 | B2 | * | 1/2006 | Maillard | 380/210 |
| 7,010,685 | B1 | * | 3/2006 | Candelore | 713/164 |
| 7,058,809 | B2 | * | 6/2006 | White et al. | 713/176 |

(Continued)

FOREIGN PATENT DOCUMENTS

FR    2732537  A1    10/1996

(Continued)

*Primary Examiner*—Nasser G Moazzami
*Assistant Examiner*—Shanto M Abedin
(74) *Attorney, Agent, or Firm*—Osha • Liang LLP

(57) ABSTRACT

A method for processing data involving receiving a scrambled program and encrypted data including at least one control word used to descramble the scrambled program at a receiver/decoder operatively connected to a mass storage device. If a user does not initially have the necessary access rights, the scrambled program and the encrypted data are stored by the receiver/decoder. When the user obtains the access rights, the encrypted data is read and the at least one control word is extracted. The encrypted data is then replaced by the control word.

20 Claims, 21 Drawing Sheets

U.S. PATENT DOCUMENTS

| | | | |
|---|---|---|---|
| 7,072,865 B2 * | 7/2006 | Akiyama | 705/51 |
| 7,110,542 B1 * | 9/2006 | Tripathy | 380/201 |
| 7,117,365 B1 * | 10/2006 | Rump et al. | 713/176 |
| 7,269,744 B1 * | 9/2007 | Shippy et al. | 713/193 |
| 2002/0064376 A1 * | 5/2002 | Fukushima | 386/98 |
| 2003/0005435 A1 * | 1/2003 | Nelger et al. | 725/31 |
| 2003/0182579 A1 * | 9/2003 | Leporini et al. | 713/201 |

FOREIGN PATENT DOCUMENTS

| | | | |
|---|---|---|---|
| WO | WO 99/41874 | * | 8/1999 |
| WO | 0001109 | | 1/2000 |

* cited by examiner

SECURE DATA PROCESSING APPARATUS

FIELD OF THE INVENTION

The invention relates to a virtual smartcard, a virtual smartcard manager, apparatus for processing data, a conditional access system, a receiver/decoder, a broadcast system, a method of processing data, a method of generating a cryptographic key, a method of storing a cryptographic key value, a computer program product, a computer readable medium and a signal. The invention finds particular application in relation to conditional access systems for receiver/decoders.

BACKGROUND OF THE INVENTION

Digital television systems transmit television channels to the viewer in digital, rather than analogue, form. The digital channels are encoded into a digital data stream at the transmitter end, and are decoded at the receiver end using a digital receiver/decoder. To allow interactivity, an uplink may be provided, either via the same medium that delivers the television channels, or else via a different medium such as a telephone link. Further types of data, such as digital audio, software and interactive data can be or are also broadcast. As used herein, the term "digital television system" includes for example any satellite, terrestrial, cable and other system.

The term "receiver/decoder" as used herein may connote a receiver for receiving either encoded or non-encoded signals, for example television and/or radio signals, preferably in MPEG format, which may be broadcast or transmitted by some other means. The term may also connote a decoder for decoding received signals. Embodiments of such receiver/decoders may include a decoder integral with the receiver for decoding the received signals, for example, in a "set-top box", such as a decoder functioning in combination with a physically separate receiver, or such a decoder including additional functions, such as a web browser, a video recorder, or a television.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4, and the MPEG-4 and other contemplated MPEG standards. In the context of the present patent application, the term includes all variants, modifications or developments of MPEG formats applicable to the field of digital data transmission.

In known receiver/decoders, a releasably connectable smartcard provides secure storage of cryptographic 'secrets' (such as the master and other exploitation keys required to decode conditional access data), and also performs critical cryptographic operations in respect of the cryptographic 'secrets'. Typically, a dedicated smartcard reader is also used, providing a standard (if inflexible) interface to other software and hardware components of the receiver/decoder which require use of the smartcard.

In other developments, systems have been proposed for receiver/decoders to allow the storage (and later playback) of received audiovisual content on mass storage devices attached to or contained within the receiver/decoders. Many such systems store the audiovisual content in scrambled form for security reasons, and—principally for security reasons—use smartcards, such as those described above, to descramble the content during playback (in a similar way to the way in which the smartcards are used during live viewing of content).

The present invention seeks to address problems identified in the above prior art.

SUMMARY OF THE INVENTION

Accordingly, in a first aspect of the invention, there is provided a virtual smartcard.

The term "smartcard" as used herein preferably connotes any conventional chip-based portable card type devices possessing, for example, microprocessor and/or memory storage, particularly for performing cryptographic operations. This may include PCMCIA cards, SIM cards, and so on. In particular, the term "smartcard" is intended to imply more a portability and/or cryptographic processing ability than it is intended to imply a particular shape or size, and consequently chip devices having alternative physical forms, for example key-shaped devices such as are often used in TV decoder systems are also included in this term.

Preferably the smartcard is provided at least in part in software, and may be provided at least in part in hardware, in any suitable combination. For example, a random number generator, used pervasively in cryptographic schemes, could be implemented in hardware, with more managerial functions being implemented in software.

By providing a virtual smartcard, a degree of flexibility can be afforded to systems which otherwise require the presence of a real, physical smartcard.

This important feature is also provided in the form of apparatus for processing data, comprising a virtual smartcard. The term "data" as used herein preferably connotes information generally, in both stored form and in the form of a signal (electrical or otherwise). Preferably the data is processed by the virtual smartcard.

This feature is further provided in the form of apparatus for processing data, comprising means (such as a processor and associated memory) for emulating a smartcard, so as to provide a virtual smartcard.

The means for emulating a smartcard preferably comprises means (such as the same or a further processor) for performing a cryptographic operation and means (such as the same or a further memory) for storing cryptographic data. The means for performing a cryptographic operation is preferably chosen to be faster than the corresponding means in a real smartcard equivalent to the virtual smartcard, which can yield an improved performance with respect to the real smartcard; similarly, the means for storing cryptographic data is preferably faster and/or has a greater capacity than the corresponding means in a real smartcard, which can yield a yet further improved performance. The means for performing a cryptographic operation could be a receiver/decoder host processor, for example, and the means for storing cryptographic data could be the RAM associated with the host processor, for example.

This can allow a wide range of cryptographic tasks to be emulated in the virtual smartcard. Furthermore, this can allow functionality of the virtual smartcard beyond that of a conventional smartcard, such as allowing the successful real-time descrambling of content during a fast-forward playback mode (which conventional smartcards can fail to achieve, given the length of time they take to decrypt control words and the further amount of time spent on other time-consuming operations, such as general rights management).

In a related aspect of the invention, there is provided a virtual smartcard manager, which can allow more efficient operation of the virtual smartcard. In particular, the virtual smartcard manager may provide an abstraction layer to the implementation of the functionality of the virtual smartcard.

The term "manager" as used herein preferably connotes an entity having at least one of control, interface, and data routing and/or processing functions.

This important feature is also provided independently in the form of apparatus for processing data, comprising a virtual smartcard manager.

The apparatus preferably further comprises means for interfacing with the virtual smartcard, simplifying the management of the virtual smartcard.

This important feature is also provided independently. Accordingly, in a related aspect of the invention, there is provided apparatus for processing data, comprising means for interfacing with a virtual smartcard. Again, the data is preferably processed by the virtual smartcard.

The above apparatus preferably further comprises means for exchanging cryptographic data with the virtual smartcard. Such means for exchanging cryptographic data may comprise either means for sending cryptographic data to the virtual smartcard, or means for receiving cryptographic data from the virtual smartcard, or both. The means for sending and receiving cryptographic data could be events and function calls, for example, such as those between the virtual smartcard manager and virtual smartcard described below.

Thus the management of the virtual smartcard may be further facilitated.

If the apparatus further comprises means for determining the presence of a real smartcard equivalent to the virtual smartcard, the apparatus preferably further comprises means for exchanging cryptographic data with the real equivalent of the smartcard. The virtual smartcard may implement only a subset of the features provided by the real equivalent of the virtual smartcard, and vice versa. By determining the presence of a real smartcard equivalent to the virtual smartcard and optionally exchanging cryptographic data with it, further options can be provided for the processing of data.

The apparatus may comprise means for selecting a smartcard. The selection of an appropriate smartcard can add a degree of flexibility to the system.

In particular, the apparatus may further comprise means for decoding data using the selected smartcard, the means for selecting a smartcard being adapted to select the smartcard in dependence on a characteristic of the data. The characteristic may be, for example, the commercial importance of the data, the duration (preferably as a measure time) of the data, the size of the data, or the extent to which the data has been distributed. Thus yet more flexibility can be provided.

The data may comprise audio/visual or other content, such as an electronic book, software, games, and so on. The term "audio/visual" as used herein preferably connotes either audio or visual matter, or a combination of the two. In the context of a broadcast signal received by a receiver/decoder, the term may encompass subtitle, teletext, synchronisation and other data transmitted in close relation to audio and video components making up a television programme.

The apparatus may further comprise means for selecting one of a payload and encrypted data containing the payload, means for storing the selected payload or encrypted data, and means for replacing the stored encrypted data with the payload. This may, for example, correspond to the process of first storing in a Content Management Message (CMM) cryptographic keys (typically control words for the cryptoperiod in question), when available, or otherwise storing encrypted data containing the cryptographic keys (typically the relevant Entitlement Control Message), and then subsequently replacing the encrypted data with the corresponding key when the key is available (as described later).

By providing the above means, the requirement can be avoided of having to decrypt the payload at the time of storage (if, for example, a particular data unit which will ultimately contain the payload is being constructed at that time).

This important feature is also provided independently.

Accordingly, in a related aspect of the invention, there is provided apparatus for processing data, comprising means for selecting one of a payload and encrypted data containing the payload, means for storing the selected payload or encrypted data, and means for replacing the stored encrypted data with the payload.

As mentioned above, the encrypted data could be an Entitlement Control Message (ECM), having a payload of the control word or words necessary to descramble a given section of content. Consequently, the means for selecting is preferably adapted to select one of at least one control word and an Entitlement Control Message.

In more detail, the apparatus preferably further comprises means for sending the encrypted data to a smartcard, and means for receiving from the smartcard either the payload contained in the encrypted data or a response indicating that the payload can not be decrypted. Preferably the means for selecting one of a payload and the encrypted data is adapted to select the payload if it is available, and the encrypted data containing the payload otherwise. This can provide further flexibility.

In addition, the apparatus preferably further comprises means for at least one of storing and reproducing data, the payload being related to the data. For example, the data could be audio/visual content, and the payload could be an Entitlement Control Message (ECM) containing the control words for a particular portion of the content. This can usefully integrate the storing or reproducing of the content with the descrambling of the content (or other operations requiring the use of a smartcard).

Preferably the apparatus further comprises means for encapsulating an encrypted data object in a further encrypted data object. This can further increase the security of the encrypted data object, and may further simplify exchanges with client processes by allowing a single interface and/or suitable abstraction to be provided. Furthermore, the apparatus preferably further comprises means for encapsulating an Entitlement Control Message in a Content Management Message, with the benefits outlined earlier.

Preferably the apparatus further comprises means for encrypting the stored payload or encrypted data with an encryption key. Furthermore the apparatus preferably further comprises means for authenticating the stored payload or encrypted data with an authentication key. In both cases, this can afford greater security.

Furthermore, the apparatus preferably further comprises means for encrypting communication between the apparatus and a smartcard with a communication encryption key, and preferably further comprises means for authenticating communication between the apparatus and a smartcard with a communication authentication key. This can afford yet further security.

The above-mentioned encryption and authentication keys may consist of public and private key pairs for use with public-key cryptography, for example. Furthermore, for convenience, the communication encryption key may be identical to or derived from the encryption key, and similarly the communication authentication key may be identical to or derived from the authentication key.

The apparatus may further comprise means for establishing at least one session, and means for associating with the or each session a respective session identifier. This can further assist in the management of the smartcard or cards.

The apparatus may further comprise means for utilising a master session key to generate an encryption/authentication key, preferably a key as aforesaid. The means for utilising preferably comprises a diversifying function accepting as an input the original master session key and a diversifying value (preferably an integer) and producing as an output a further cryptographic key. Furthermore, the diversifying function is preferably chosen such that its outputs for a range of diversifying inputs are preferably substantially all cryptographically strong keys. For public/private cryptographic systems, the diversifying functions preferably employ various properties of prime numbers to ensure the cryptographic strength of the outputs.

This can simplify the generation of such an encryption/authentication key, particularly where a plurality of keys are to be generated.

This important feature is also provided independently. Accordingly, in a related aspect of the invention, there is provided apparatus for processing data, comprising means for storing a cryptographic key, and means for utilising a master session key to generate one of an encryption and authentication key for encrypting and authenticating the stored cryptographic key respectively.

Furthermore, the encryption/authentication key may relate to a given session, in which case the means for utilising may be adapted to diversify the master session key with the corresponding session identifier. This can provide a systematic and simple way to generate any number of keys.

The apparatus may further comprise means for using the encryption/authentication key to encrypt/authenticate a further session. For example, the same key or keys can be used to encrypt and/or authenticate a session between the HDVR and CMPS, and the CMPS and the virtual smartcard (all described below). This can reduce the computational burden by reducing the number of keys which need to be generated.

The apparatus preferably further comprises means for generating the encryption/authentication key in dependence on non-cryptographic data in a receiver/decoder. The non-cryptographic data is preferably unique to the receiver/decoder, or otherwise different to corresponding non-cryptographic data elsewhere. Preferably also the non-cryptographic data has a further use than to generate a cryptographic key, and is preferably stochastic in nature (that is, unpredictable to some extent).

This can allow the faster generation of such an encryption/authentication key.

This important feature is also provided independently. Accordingly, in a related aspect, there is provided apparatus for processing data, comprising means for generating a cryptographic key in dependence on non-cryptographic data in a receiver/decoder.

Preferably the apparatus further comprises a random number generator, means for seeding the random number generator with the non-cryptographic data, and means for generating the key in dependence on the output of the random number generator. This can provide a useful way to generate a key using a known random number generator.

The apparatus preferably further comprises means for measuring at least one property, which property is at least one of random, unpredictable, time-varying and geographically-varying, and means for generating the key in dependence on the or each property. Preferably at least 3, 5, 10, 20 or 50 properties, preferably of a receiver/decoder, are measured. This can aid the randomness of the resulting key.

In particular, the means for generating the key may be adapted to generate the key in dependence on at least one of a property of a bit stream received by the receiver/decoder, a property of the hardware environment within the receiver/decoder, a property of a software environment within the receiver/decoder, and a measurable property of the environment outside the receiver/decoder. Such properties could include, for example, a bit error rate (BER) of a tuner, a signal level, the number of accesses to a particular part of the receiver/decoder software, the output of a detuned radio frequency (RF) receiver, and so on.

The means for generating the key may be adapted to generate the key before the key is required, and preferably in response to an initialisation or reinitialisation of the receiver/decoder (such as after a reboot, for example). Alternatively or additionally, the apparatus may further comprise means for generating the key in response to the invocation of a command to perform an operation which operation requires the provision of the key. These features, in combination or independently, can provide more flexibility in the generation of keys.

The term "command" as used herein preferably connotes a physical manifestation of a software routine programmed to carry out a specified function, preferably in the form of electrical impulses in a memory or in a more permanent form, such as a recording of the routine on a suitable data carrier, for example. Preferably the manifestation of the routine is immediately executable by a processor, being stored as object code, for example. The term may also be extended to cover the actual invocation of such a routine, either in the form of a physically-embodied instruction to execute the routine, or as an actual signal—such as a remote procedure call (RPC)—designed to cause the routine to execute.

The apparatus may further comprise means for storing an encryption/authentication key, preferably a key as aforesaid. This can improve the efficiency of the system by avoiding the need to recreate such a key. Furthermore, the apparatus may further comprise means for determining whether or not to store the key, for example if the key is deemed too valuable for the level of security which is available. This can improve the security of the system.

The apparatus preferably further comprises means for storing in a respective plurality of locations data by which the key can be constituted. The cryptographic key may comprise more than just a cryptographic key value, and may, for example, comprise any of a master key, key generation algorithm and key diversifier (such as a session ID, for example). Also, the plurality of locations are preferably distinct and non-contiguous (at least in part), and may be present in any number of devices, such as a broadcast centre, subscriber data centre, smartcard, receiver/decoder, and so on. Furthermore, the plurality of locations may comprise any of an EEPROM, RAM, flash RAM, hard disc and smartcard within a receiver/decoder. The data may advantageously also be stored at least in part in the apparatus itself, which can reduce the exposure of the data. Furthermore, by data by which the key can be constituted in plurality of locations, rather than a single location, for example, the security of the system can be improved.

This important feature is also provided independently. Accordingly, in a related aspect of the invention, there is provided apparatus for processing data, comprising means for storing in a respective plurality of locations data by which the key can be constituted.

The apparatus may comprise means for dividing the key into a plurality of portions, and means for storing in a respective plurality of locations the plurality of portions. The means for dividing may be adapted to divide a sequence of data bits representing the cryptographic key into a plurality of portions each composed of a smaller number of data bits, and the means for storing the plurality of portions may be adapted to store the portions at different addresses in a particular storage medium. Preferably the portions are composed of a multiple of 1, 2, 4, 8, 16, 32 or more bits. Preferably at least two, and preferably all, of the portions have the same size.

By creating smaller (and therefore harder to notice) portions with respect to the comparatively large size of keys, the key data can be more easily hidden from view.

Consequently, the means for storing may be adapted to store at least in part in a receiver/decoder. This can simplify the storage and reduce the dependence on external storage sources.

Preferably the apparatus comprises means for selecting the plurality of locations such that the plurality of locations are pseudorandomly distributed throughout the receiver/decoder. This can again assist in concealing the relevant key. Preferably also the means for storing is adapted to store in a plurality of physical devices, as noted above, with the same advantage.

The apparatus may also comprise means for creating a region of substantially random numbers in which at least one of the plurality of locations is located. Since cryptographic keys can sometimes be identified by their apparent randomness, storing the key components in a region of substantially random values can more effectively hide the key.

The apparatus preferably further comprises means for reading a plurality of key portions from a respective plurality of locations, and means for combining the key portions to form a cryptographic key. Preferably the means for combining the key portions is adapted to perform a reversible transformation on the plurality of key portions (such as a matrix inversion in the case of a linear algebraic transformation). This can facilitate the reproduction of stored cryptographic keys.

In a related aspect, there is provided apparatus for processing data, comprising a processor and associated memory, the processor being adapted to emulate a smartcard so as to provide a virtual smartcard.

Preferably the apparatus further comprises a virtual smartcard. The processor may also be adapted to perform a cryptographic operation, and the memory may be adapted to store cryptographic data.

In a further related aspect, there is provided apparatus for processing data, comprising a processor and associated memory, the processor being adapted to interface with a virtual smartcard.

The processor may be adapted to exchange cryptographic data with the virtual smartcard, and may also or alternatively be adapted to determine the presence of a real smartcard equivalent to the virtual smartcard. Preferably the processor is further adapted to exchange cryptographic data with the real equivalent of the smartcard.

The processor may be further adapted to select a smartcard, and is preferably adapted to decode data using the selected smartcard, and select the smartcard in dependence on a characteristic of the data. Preferably the processor is further adapted to select one of a payload and encrypted data containing the payload, store the selected payload or encrypted data, and replace the stored encrypted data with the payload.

In a related aspect of the invention there is also provided apparatus for processing data, comprising a processor and associated memory, the processor being adapted to select one of a payload and encrypted data containing the payload, store the selected payload or encrypted data, and replace the stored encrypted data with the payload.

The processor may be adapted to select one of at least one control word and an Entitlement Control Message. Furthermore, the processor may be adapted to send the encrypted data to a smartcard, and receive from the smartcard either the payload contained in the encrypted data or a response indicating that the payload can not be decrypted. Preferably the processor is adapted to select the payload if it is available, and the encrypted data containing the payload otherwise.

The processor may be adapted to store or reproduce data, the payload being related to the data. The processor may be adapted to encapsulate an encrypted data object in a further encrypted data object, and furthermore may be adapted to encapsulate an Entitlement Control Message in a Content Management Message.

Preferably the processor is adapted to encrypt the stored payload or encrypted data with an encryption key, and may be adapted to authenticate the stored payload or encrypted data with an authentication key. Also preferably the processor is adapted to encrypt communication between the apparatus and a smartcard with a communication encryption key, and may be adapted to authenticate communication between the apparatus and a smartcard with a communication authentication key.

The processor may be adapted to establish at least one session, and associate with the or each session a respective session identifier. The processor is preferably adapted to utilise a master session key to generate an encryption/authentication key.

In a related aspect, there is provided apparatus for processing data, comprising a processor and associated memory, the processor being adapted to store (preferably in the associated memory) a cryptographic key, and utilise a master session key to generate one of an encryption and authentication key for encrypting and authenticating the stored cryptographic key respectively.

Preferably the processor is adapted to generate both the encryption key and authentication key from the master session key. More preferably the processor is adapted to diversify the master session key with the corresponding session identifier, and may be adapted to use the encryption/authentication key to encrypt/authenticate a further session.

The processor is preferably adapted to generate the encryption/authentication key in dependence on non-cryptographic data in a receiver/decoder.

In a further aspect of the invention, there is provided apparatus for processing data, comprising a processor and associated memory, the processor being adapted to generate a cryptographic key in dependence on non-cryptographic data in a receiver/decoder.

The apparatus preferably further comprises a random number generator, the processor being adapted to seed the random number generator with the non-cryptographic data, and generate the key in dependence on the output of the random number generator.

Preferably the apparatus further comprises a detector for measuring at least one property, which property is at least one of random, unpredictable, time-varying and geographically-varying, the processor being adapted to generate the key in dependence on the or each property. Furthermore, the processor may be adapted to generate the key in dependence on at least one of a property of a bit stream received by the receiver/decoder, a property of the hardware environment within the receiver/decoder, a property of a software environment within the receiver/decoder, and a measurable property of the environment outside the receiver/decoder.

The processor may be adapted to generate the key before the key is required; alternatively or additionally, the processor may be adapted to generate the key in response to the invocation of a command to perform an operation which operation requires the provision of the key.

The processor may be adapted to store an encryption/authentication key, and is preferably adapted to determine whether or not to store the key. The processor may further be adapted to store in a respective plurality of locations data by which the key can be constituted.

In another aspect of the invention, there is provided apparatus for processing data, comprising a processor and associated memory, the processor being adapted to store in a respective plurality of locations data by which a cryptographic key value can be constituted.

The processor is preferably adapted to divide the key into a plurality of portions, and store in a respective plurality of locations the plurality of portions. The processor is preferably further adapted to store at least in part in a receiver/decoder. Furthermore, the processor may be adapted to select the plurality of locations such that the plurality of locations are pseudorandomly distributed throughout the receiver/decoder.

The processor is preferably adapted to store in a plurality of physical devices, and may be adapted to create a region of substantially random numbers in which at least one of the plurality of locations is located. The processor may further be adapted to read data from a respective plurality of locations, and combine the data to form a cryptographic key.

In a yet further aspect of the invention, there is provided a receiver/decoder, comprising apparatus as aforesaid.

In a further aspect of the invention, there is provided a conditional access system, comprising apparatus as aforesaid.

In another aspect of the invention, there is provided a broadcast system comprising a broadcast centre and a receiver/decoder as aforesaid.

In a yet further aspect of the invention, there is provided a broadcast system comprising apparatus as aforesaid.

In another aspect of the invention, there is provided a method of processing data, comprising emulating a smartcard so as to provide a virtual smartcard.

Preferably the method further comprises providing a virtual smartcard. The step of emulating a smartcard preferably comprises performing a cryptographic operation, and storing cryptographic data.

In a further aspect of the invention, there is provided a method of processing data, comprising interfacing with a virtual smartcard.

The method preferably comprises exchanging cryptographic data with the virtual smartcard, and may also or alternatively comprise determining the presence of a real smartcard equivalent to the virtual smartcard. Preferably the method further comprises exchanging cryptographic data with the real equivalent of the smartcard.

The method may further comprise selecting a smartcard, and preferably comprises decoding data using the selected smartcard, and selecting the smartcard in dependence on a characteristic of the data. Preferably the method further comprises selecting one of a payload and encrypted data containing the payload, storing the selected payload or encrypted data, and replacing the stored encrypted data with the payload.

In a further aspect of the invention, there is provided a method of processing data, comprising selecting one of a payload and encrypted data containing the payload, storing the selected payload or encrypted data, and replacing the stored encrypted data with the payload.

The step of selecting may comprise selecting one of at least one control word and an Entitlement Control Message. Furthermore, the method may further comprise sending the encrypted data to a smartcard, and receiving from the smartcard either the payload contained in the encrypted data or a response indicating that the payload can not be decrypted. Preferably the method comprises selecting the payload if it is available, and the encrypted data containing the payload otherwise.

The method may comprise storing or reproducing data, the payload being related to the data. The method may further comprise encapsulating an encrypted data object in a further encrypted data object, which step may further comprise encapsulating an Entitlement Control Message in a Content Management Message.

Preferably the method further comprises encrypting the stored payload or encrypted data with an encryption key, and may comprise authenticating the stored payload or encrypted data with an authentication key. Also preferably the method comprises encrypting communication between an apparatus and a smartcard with a communication encryption key, and may comprise authenticating communication between the apparatus and a smartcard with a communication authentication key.

The method may comprise establishing at least one session, and associating with the or each session a respective session identifier. The method preferably comprises utilising a master session key to generate an encryption/authentication key.

In a related aspect, there is provided a method of processing data, comprising storing a cryptographic key, and utilising a master session key to generate one of an encryption and authentication key for encrypting and authenticating the stored cryptographic key respectively.

Preferably the method comprises generating both the encryption key and authentication key from the master session key. More preferably the method may comprise diversifying the master session key with the corresponding session identifier, and may comprise using the encryption/authentication key to encrypt/authenticate a further session.

The method preferably comprises generating the encryption/authentication key in dependence on non-cryptographic data in a receiver/decoder.

In a yet further aspect of the invention, there is provided a method of generating a cryptographic key, comprising generating the key in dependence on non-cryptographic data in a receiver/decoder.

The method preferably further comprises seeding a random number generator with the non-cryptographic data, obtaining an output from the random number generator, and generating the key in dependence on the output of the random number generator.

Preferably the method further comprises measuring at least one property, which property is at least one of random, unpredictable, time-varying and geographically-varying, the method further comprising generating the key in dependence on the or each property. Furthermore, the method may comprise generating the key in dependence on at least one of a property of a bit stream received by the receiver/decoder, a property of the hardware environment within the receiver/decoder, a property of a software environment within the receiver/decoder, and a measurable property of the environment outside the receiver/decoder.

The method may comprise generating the key before the key is required; alternatively or additionally, the method may comprise generating the key in response to the invocation of a command to perform an operation which operation requires the provision of the key.

The method may comprise storing an encryption/authentication key, and preferably further comprises determining whether or not to store the key. The method may further comprise storing in a respective plurality of locations data by which the key can be constituted.

In a related aspect of the invention, there is provided a method of storing a cryptographic key value, comprising storing in a respective plurality of locations data by which the cryptographic key value can be constituted.

The method preferably further comprises dividing the key into a plurality of portions, and storing in a respective plurality of locations the plurality of portions. The method preferably further comprises storing at least in part in a receiver/decoder. Furthermore, the method may comprise selecting the plurality of locations such that the plurality of locations are pseudorandomly distributed throughout the receiver/decoder.

The method preferably further comprises storing in a plurality of physical devices, and may comprise creating a region of substantially random numbers in which at least one of the plurality of locations is located. The method may comprise reading data from a respective plurality of locations, and combining the data to form a cryptographic key.

In a further aspect of the invention, there is provided a computer program product, adapted to perform a method as aforesaid.

In a yet further aspect of the invention, there is provided a computer program product, comprising a virtual smartcard.

In a further aspect of the invention, there is provided a computer program product, comprising means for emulating a smartcard so as to provide a virtual smartcard.

The means for emulating a smartcard preferably comprises means for performing a cryptographic operation and means for storing cryptographic data.

In another aspect of the invention, there is provided a computer program product, comprising a virtual smartcard manager.

In a further aspect of the invention, there is provided a computer program product, comprising means for interfacing with a virtual smartcard.

The computer program product preferably further comprises means for exchanging cryptographic data with the virtual smartcard, and may further comprise means for determining the presence of a real smartcard equivalent to the virtual smartcard. The computer program product may further comprise means for exchanging cryptographic data with the real equivalent of the smartcard.

The computer program product preferably further comprises means for selecting a smartcard. The computer program product may further comprise means for decoding data using the selected smartcard, the means for selecting a smartcard being adapted to select the smartcard in dependence on a characteristic of the data.

Preferably the computer program product further comprises means for selecting one of a payload and encrypted data containing the payload, means for storing the selected payload or encrypted data, and means for replacing the stored encrypted data with the payload.

In a yet further aspect of the invention, there is provided computer program product, comprising means for selecting one of a payload and encrypted data containing the payload, means for storing the selected payload or encrypted data, and means for replacing the stored encrypted data with the payload.

The means for selecting may be adapted to select one of at least one control word and an Entitlement Control Message. The computer program product preferably further comprises means for sending the encrypted data to a smartcard, and means for receiving from the smartcard either the payload contained in the encrypted data or a response indicating that the payload can not be decrypted.

Preferably the means for selecting one of a payload and the encrypted data is adapted to select the payload if it is available, and the encrypted data containing the payload otherwise. The computer program product may further comprise means for at least one of storing and reproducing data, the payload being related to the data.

The computer program product preferably further comprises means for encapsulating an encrypted data object in a further encrypted data object, and preferably further comprises means for encapsulating an Entitlement Control Message in a Content Management Message.

The computer program product preferably further comprises means for encrypting the stored payload or encrypted data with an encryption key, and may comprise means for authenticating the stored payload or encrypted data with an authentication key.

The computer program product preferably also further comprises means for encrypting communication between an apparatus and a smartcard with a communication encryption key, and may comprise means for authenticating communication between the apparatus and a smartcard with a communication authentication key.

Preferably the computer program product preferably further comprises means for establishing at least one session, and means for associating with the or each session a respective session identifier. Furthermore, the computer program product may further comprise means for utilising a master session key to generate an encryption/authentication key.

In a further aspect of the invention, there is provided a computer program product, comprising means for storing a cryptographic key, and means for diversifying a master session key to generate one of an encryption and authentication key for encrypting and authenticating the stored cryptographic key respectively.

The means for utilising a master session key may be adapted to generate both the encryption key and authentication key from the master session key. The means for utilising is preferably adapted to diversify the master session key with the corresponding session identifier. The computer program product preferably further comprises means for using the encryption/authentication key to encrypt/authenticate a further session, and may further comprise means for generating the encryption/authentication key in dependence on non-cryptographic data in a receiver/decoder.

In another aspect of the invention, there is provided a computer program product, comprising means for generating a cryptographic key in dependence on non-cryptographic data in a receiver/decoder.

The computer program product may further comprise a random number generator, means for seeding the random number generator with the non-cryptographic data, and means for generating the key in dependence on the output of the random number generator.

Furthermore, the computer program product may further comprise means for measuring at least one property, which property is at least one of random, unpredictable, time-varying and geographically-varying, and means for generating the key in dependence on the or each property. In particular, the means for generating the key may be adapted to generate the key in dependence on at least one of a property of a bit stream received by the receiver/decoder, a property of the hardware environment within the receiver/decoder, a property of a software environment within the receiver/decoder, and a measurable property of the environment outside the receiver/decoder.

The means for generating the key is preferably adapted to generate the key before the key is required, but alternatively or additionally the computer program product may further comprise means for generating the key in response to the invocation of a command to perform an operation which operation requires the provision of the key.

The computer program product preferably further comprises means for storing an encryption/authentication key, and may comprise means for determining whether or not to store the key. Furthermore, the computer program product may further comprise means for storing in a respective plurality of locations data by which the key can be constituted.

In a yet further aspect of the invention, there is provided computer program product, comprising means for storing in a respective plurality of locations data by which a cryptographic key value can be constituted.

The computer program product preferably further comprises means for dividing the key into a plurality of portions, and means for storing in a respective plurality of locations the plurality of portions. The means for storing may be adapted to store at least in part in a receiver/decoder. Preferably the computer program product further comprises means for selecting the plurality of locations such that the plurality of locations are pseudorandomly distributed throughout the receiver/decoder.

The means for storing is preferably adapted to store in a plurality of physical devices. The computer program product preferably further comprises means for creating a region of substantially random numbers in which at least one of the plurality of locations is located, and may comprise means for reading data from a respective plurality of locations, and means for combining the data to form a cryptographic key.

In a further aspect of the invention, there is provided a computer readable medium, comprising a computer program product as aforesaid.

In a yet further aspect of the invention, there is provided a signal, tangibly embodying a computer program product as aforesaid.

The terms "scrambled" and "encrypted" and "control word" and "key" have been used here in a number of ways for the purpose of clarity of language. However, it will be understood that no fundamental distinction is to be made between "scrambled data" and "encrypted data" or between a "control word" and a "key".

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION

System Overview

Figure 1:
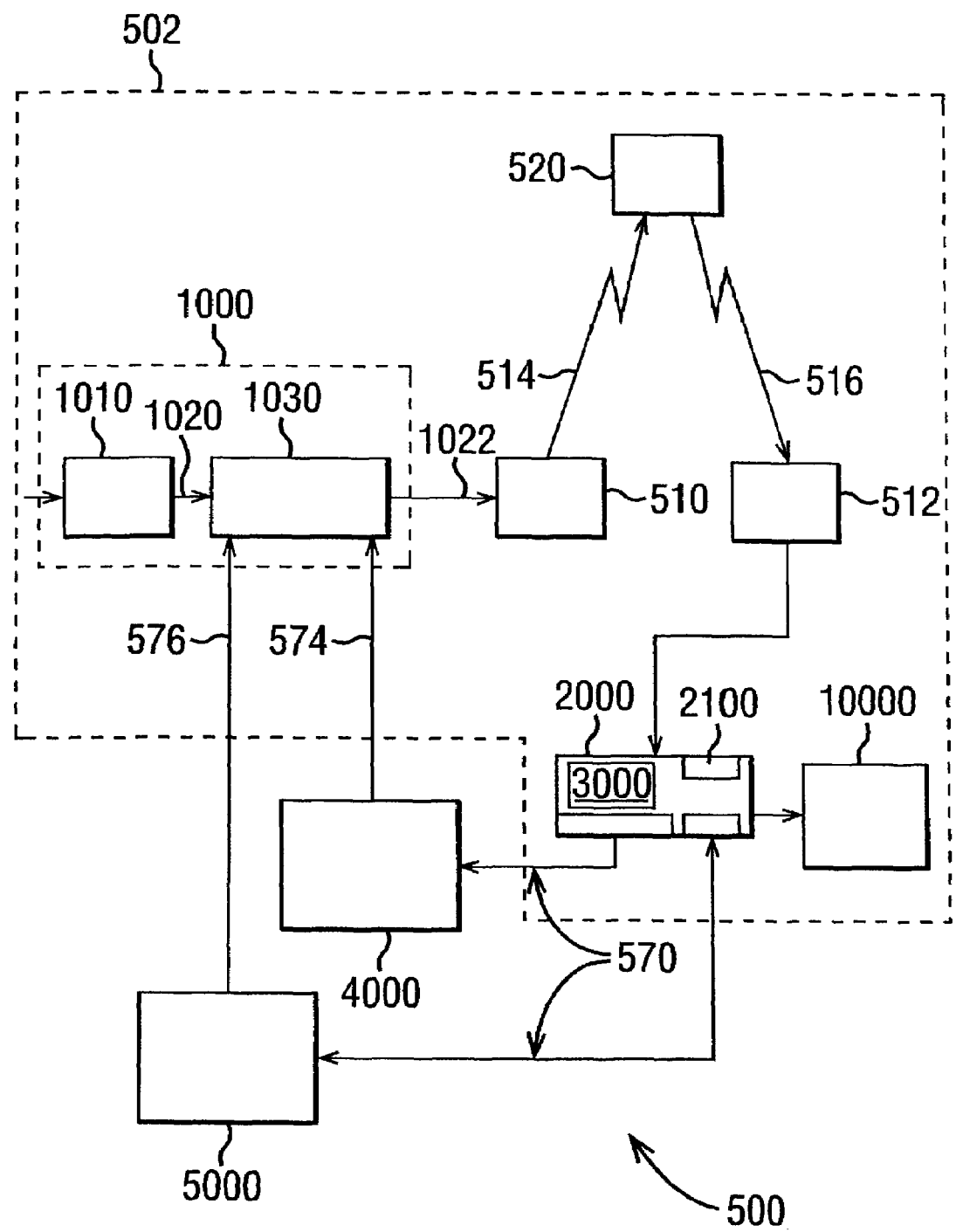
FIG. 1 is an overview of a satellite digital television system.

An overview of a digital television system 500 is shown in FIG. 1. As will be discussed below, the system 500 comprises a broadcast centre 1000, a receiver/decoder 2000, a software/hardware architecture 3000 of the receiver/decoder, an interactive system 4000, and a conditional access system 5000, as will all be discussed below.

The system 500 includes a mostly conventional digital television system 502 that uses the known MPEG-2 compression system to transmit compressed digital signals. In more detail, MPEG-2 compressor 1010 in a broadcast centre 1000 receives a digital signal stream (typically a stream of video signals). The compressor 1010 is connected by linkage 1020 to a multiplexer and scrambler 1030.

The multiplexer 1030 receives a plurality of further input signals, assembles the transport stream and transmits compressed digital signals to a transmitter 510 of the broadcast centre via linkage 1022, which can of course take a wide variety of forms including telecommunications links. The transmitter 510 transmits electromagnetic signals via uplink 514 towards a satellite transponder 520, where they are electronically processed and broadcast via notional downlink 516 to earth receiver 512, conventionally in the form of a dish owned or rented by the end user. Other transport channels for transmission of the data are of course possible, such as terrestrial broadcast, cable transmission, combined satellite/cable links, telephone networks etc.

The signals received by receiver 512 are transmitted to an integrated receiver/decoder 2000 owned or rented by the end user and connected to the end user's television set 10000. The receiver/decoder 2000 decodes the compressed MPEG-2 signal into a television signal for the television set 10000. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In the receiver/decoder 2000 a hard disk 2100 is provided, on which audiovisual and other data can be stored. This allows advanced recording and playback facilities for programmes received by the receiver/decoder, and also allows large amounts of other types of data, such as electronic programme guide data, to be stored in the receiver/decoder.

A content management and protection system (CMPS) 2300 (not shown) in the receiver/decoder provides the ability securely and flexibly to control the recording and playback of data on the hard disk 2100 (or other storage device).

In a multichannel system, the multiplexer 1030 handles audio and video information received from a number of parallel sources and interacts with the transmitter 510 to broadcast the information along a corresponding number of channels. In addition to audiovisual information, messages or applications or any other sort of digital data may be introduced in some or all of these channels interlaced with the transmitted digital audio and video information.

An interactive system 4000 is connected to the multiplexer 1030 and the receiver/decoder 2000, and is located partly in the broadcast centre and partly in the receiver/decoder. It enables the end user to interact with various applications via a back channel 570. The back channel may be, for example a Public Switched Telephone Network (PSTN) channel (for example, a modemmed back channel) or an Out of Band (OOB) channel.

A conditional access system 5000, also connected to the multiplexer 1030 and the receiver/decoder 2000 and again located partly in the broadcast centre and partly in the receiver/decoder, enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2000. Using the receiver/decoder 2000 and smartcard, the end user may purchase commercial offers in either a subscription mode or a pay-per-view mode. Typically this is achieved using the back channel 570 which is used by the interactive system 4000.

As mentioned above, programmes transmitted by the system are scrambled at the multiplexer 1030, the conditions and encryption keys applied to a given transmission being determined by the access control system 5000. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 2000 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

Figure 2:
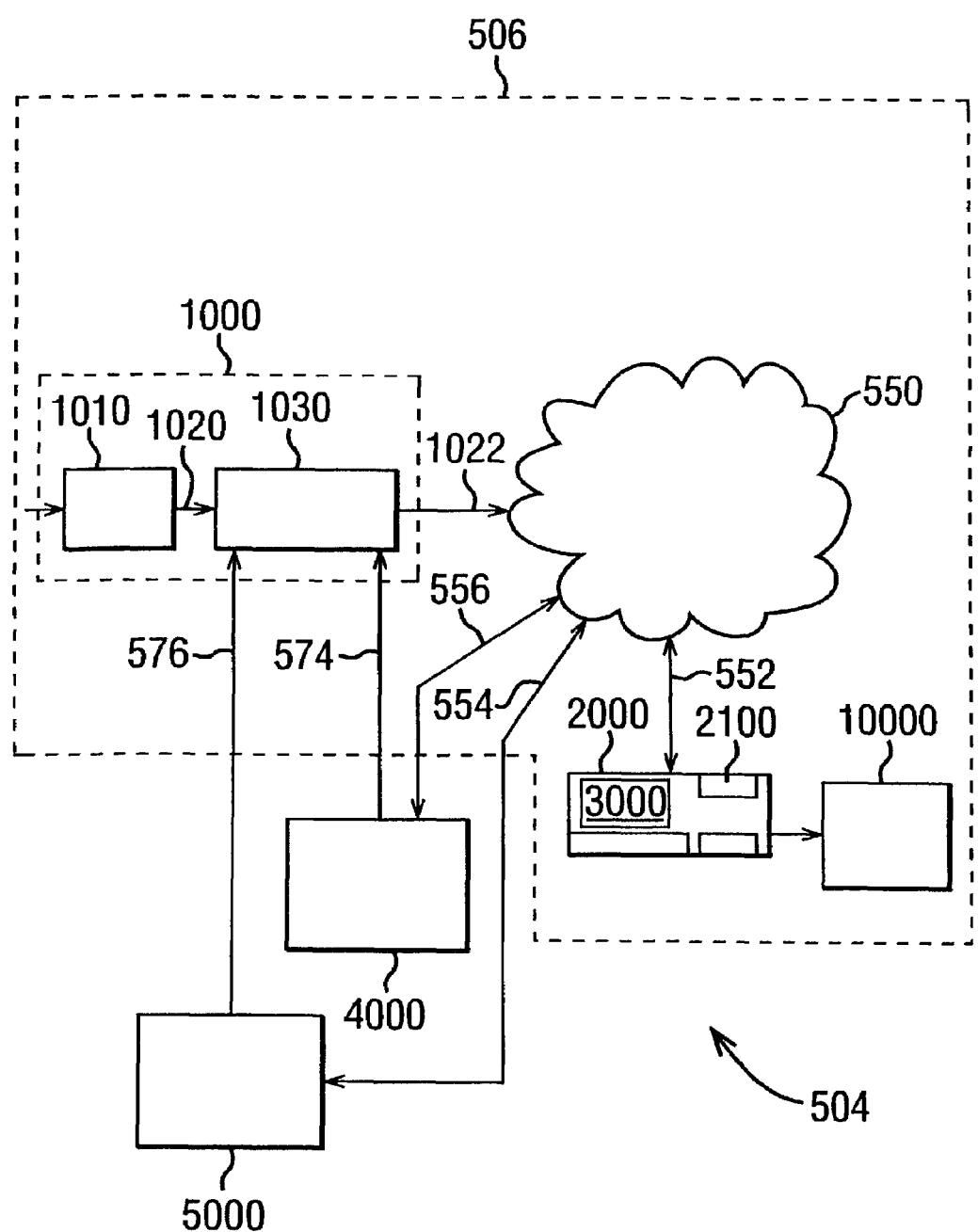
FIG. 2 is an overview of a cable digital television system.

FIG. 2 illustrates an alternative embodiment of a digital television system 504, utilising a cable network as the broadcast medium for the compressed digital signals. In this figure, like parts are indicated with like numerals.

The satellite transponder and transmitting and receiving stations are replaced by a cable network 550. Additionally, in this particular embodiment, the modemmed back channel between the receiver/decoder 2000 and the interactive system 4000 and conditional access system 5000 is removed, replaced by linkages 554, 556 between the cable network 550 and the conditional access system 5000 and interactive system 4000 respectively. The receiver/decoder 2000 thus communicates with the other systems via the cable network 550, utilising a cable modem or other means to allow it to send and receive data via the same link as it receives data from the broadcast centre.

The cable network 550 may be any form of wide area network (WAN), such as a dedicated connection, the internet, local cable distribution network, wireless connection, or any combination of the above. In the present embodiment, the hybrid fibre coax (HFC) network is used. It is appreciated that the various means of communication between the receiver/decoder 2000 and the other components of the television system are interchangeable.

Conditional Access System

Figure 3:
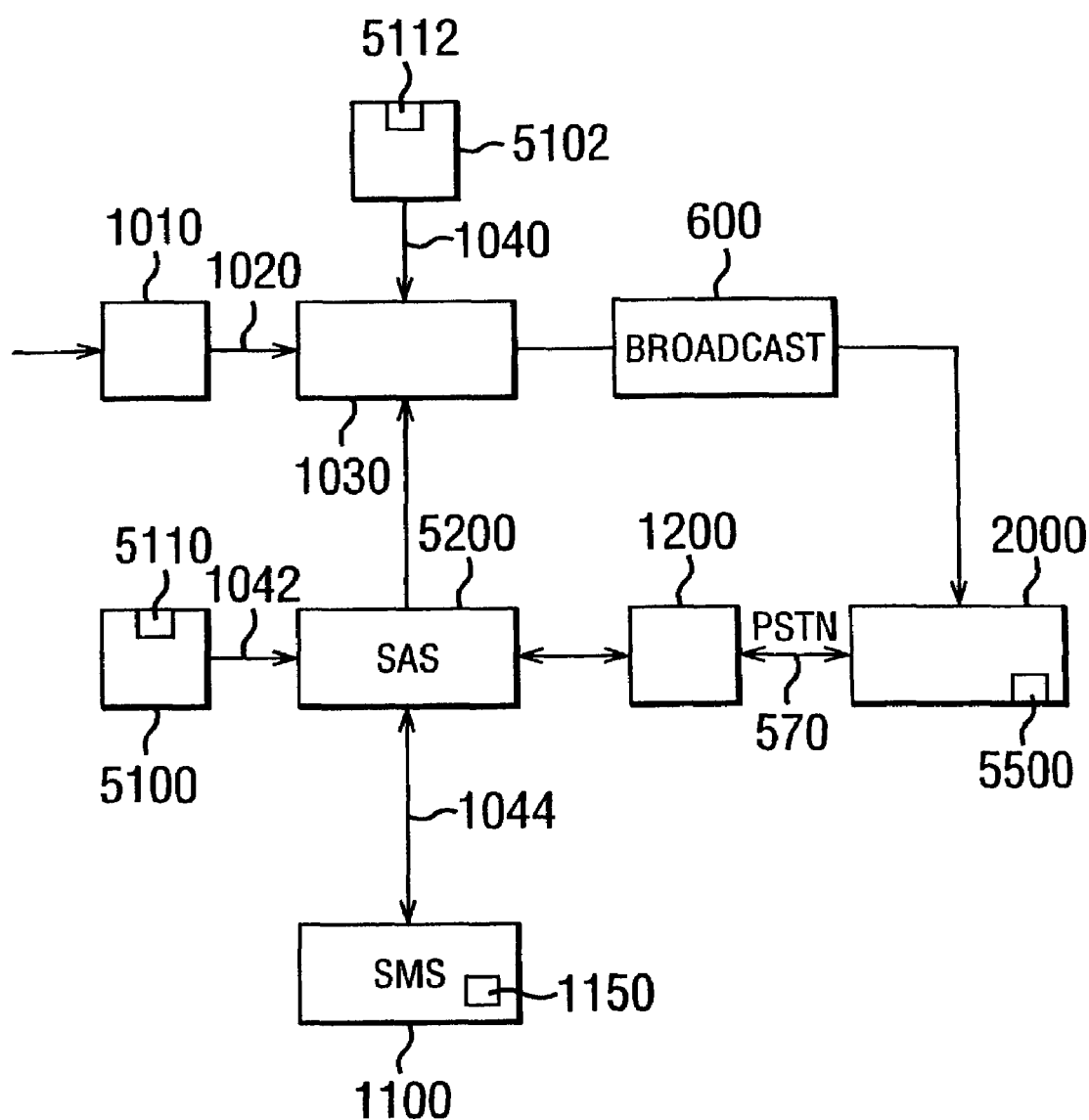
FIG. 3 is an overall system view, with the head-end shown in more detail.

With reference to FIG. 3, in overview the conditional access system 5000 includes a Subscriber Authorization System (SAS) 5200. The SAS 5200 is connected to one or more Subscriber Management Systems (SMS) 1100, one SMS for each broadcast supplier, by a link 1044, which may be a TCP-IP link or other type of link. Alternatively, one SMS could be shared between two commercial operators, or one operator could use two SMSs, and so on.

First encrypting units in the form of ciphering units 5100 utilising "mother" smartcards 5110 are connected to the SAS by linkage 1042. Second encrypting units again in the form of ciphering units 5102 utilising mother smartcards 5112 are connected to the multiplexer 1030 by linkage 1040. The receiver/decoder 2000 receives a "daughter" smartcard 5500. The receiver/decoder is connected directly to the SAS 5200 via communications servers 1200 and the modemmed back channel 570. The SAS sends amongst other things subscription rights to the daughter smartcard on request.

In variants of the preferred embodiment, internet or cable connections either complement or replace the PSTN 570 and communications servers 1200.

The smartcards contain confidential information from one or more commercial operators. The "mother" smartcard encrypts different kinds of messages and the "daughter" smartcards decrypt the messages, if they have the rights to do so.

With reference to FIG. 3, in the broadcast centre, the digital video signal is first compressed (or bit rate reduced), using the MPEG-2 compressor 1010. This compressed signal is then transmitted to the multiplexer and scrambler 1030 in order to be multiplexed with other data, such as other compressed data.

The scrambler generates a control word used in the scrambling process and included in the MPEG-2 stream in the multiplexer 1030. The control word is generated internally and enables the end user's integrated receiver/decoder 2000 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 5102 via the linkage 1040. In this unit, an ECM is generated, encrypted and transmitted on to the multiplexer and scrambler 1030.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM is required.

The multiplexer 1030 receives electrical signals comprising encrypted EMMs from the SAS 5200, encrypted ECMs from the second encrypting unit 5102 and compressed programmes from the compressor 1010. The multiplexer 1030 scrambles the programmes and transmits the scrambled programmes, the encrypted EMMs and the encrypted ECMs as electric signals to broadcast system 600, which may be for example a satellite system as shown in FIG. 1, or other broadcast system. The receiver/decoder 2000 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 2000 extracts the corresponding ECM from the MPEG-2 stream and passes the ECM to the "daughter" smartcard 5500 of the end user. This slots into a housing in the receiver/decoder 2000. The daughter smartcard 5500 controls whether the end user has the right to decrypt the ECM and to access the programme. If not, a negative status is passed to the receiver/decoder 2000 to indicate that the programme cannot be descrambled. If the end user does have the rights, the ECM is decrypted and the control word extracted. The decoder 2000 can then descramble the programme using this control word. The MPEG-2 stream is decompressed and translated into a video signal for onward transmission to television set 10000.

If the programme is not scrambled, no ECM will have been transmitted with the MPEG-2 stream and the receiver/decoder 2000 decompresses the data and transforms the signal into a video signal for transmission to television set 10000.

The subscriber management system (SMS) 1100 includes a database 1150 which manages, amongst others, all of the end user files, commercial offers (such as tariffs and promotions), subscriptions, PPV details, and data regarding end user consumption and authorization. The SMS may be physically remote from the SAS.

The SMS 1100 transmits messages to the SAS 5200 which imply modifications to or creations of Entitlement Management Messages (EMMs) to be transmitted to end users. The SMS 1100 also transmits messages to the SAS 5200 which imply no modifications or creations of EMMs but imply only a change in an end user's state (relating to the authorization granted to the end user when ordering products or to the amount that the end user will be charged). The SAS 5200 also sends messages (typically requesting information such as call-back information or billing information) to the SMS 1100, so that it will be apparent that communication between the two is two-way.

Receiver/Decoder

Figure 4:
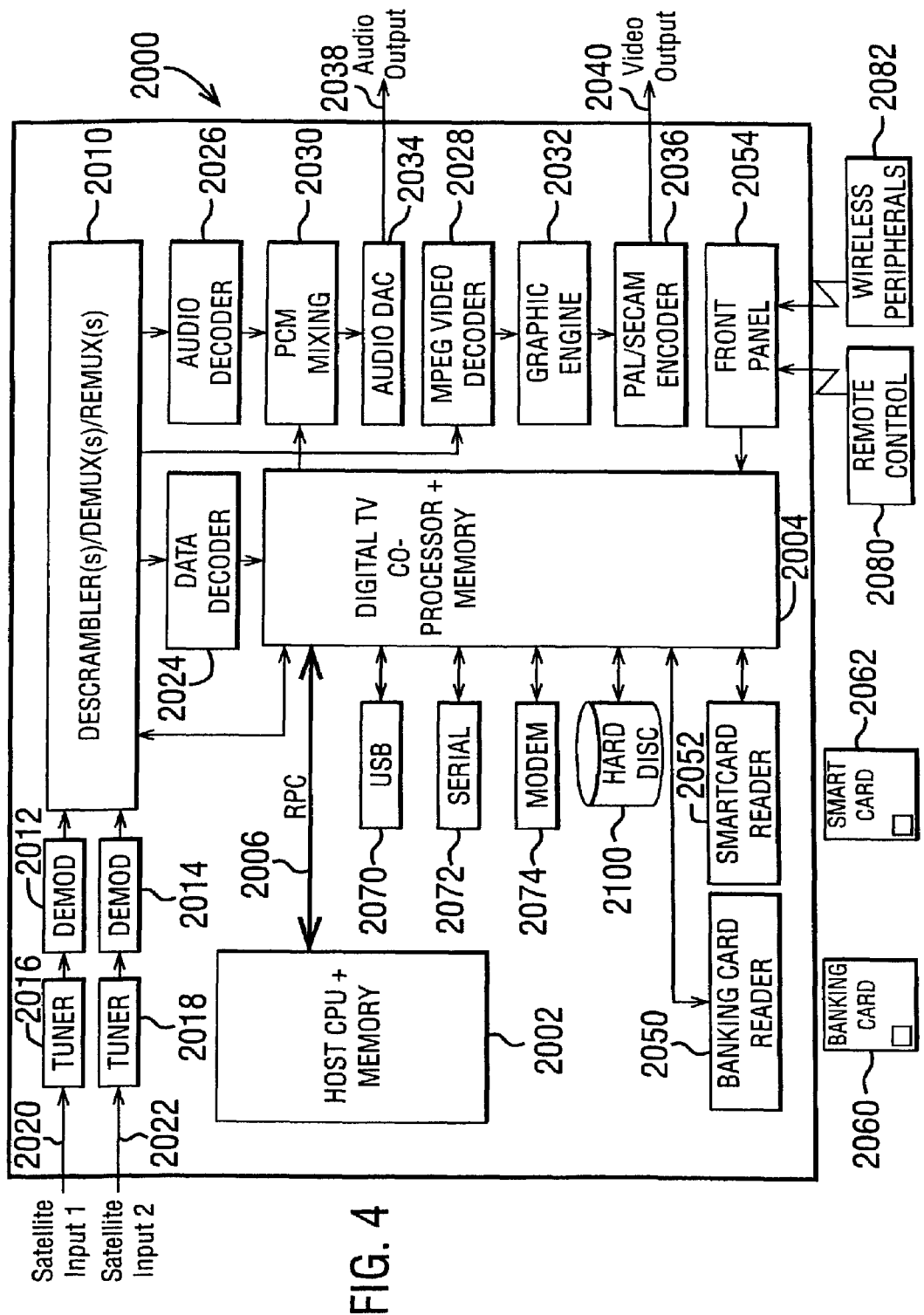
FIG. 4 is a schematic of the component architecture of the receiver/decoder.

Referring to FIG. 4, the various elements of receiver/decoder 2000 will now be described in terms of functional blocks.

The receiver/decoder 2000, which may be, for example, a digital set-top box (DSTB), comprises a central host processor 2002 and a digital TV coprocessor 2004, both having associated memory elements (not shown) and joined by a coprocessor bus 2006. The coprocessor 2004 is adapted to receive input data from a USB interface 2070, a serial interface 2072, a parallel interface (not shown), a modem 2074 (connected to the modem back channel 570 of FIG. 1), and switch contacts on the front panel 2054 of the decoder.

The receiver/decoder is additionally adapted to receive inputs from an infra-red remote control 2080 (and optionally from other wireless peripherals 2082 such as Bluetooth-enabled devices) and also possesses two smartcard readers 2050, 2052 adapted to read bank and subscription smartcards 2060, 2062 respectively. The subscription smartcard reader 2052 engages with an inserted subscription card 2062 and with a conditional access unit (not shown) to supply the necessary control word to a demultiplexer/descrambler/remultiplexer unit 2010 to enable the encrypted broadcast signal to be descrambled. The decoder also includes a conventional tuner 2016 and demodulator 2012 to receive and demodulate the satellite transmission before being filtered and demultiplexed by the demodulator/descrambler unit 2010. A second tuner 2018 and second demodulator 2014 are also provided, to allow, amongst other things, a second channel to be received and decoded in parallel with the first.

A hard disk 2100 is also provided, allowing storage of programme and application data received and generated by the receiver/decoder. In conjunction with the two tuners 2016, 2018, two demodulators 2012, 2014, the descrambler/demultiplexer/remultiplexer 2010, and the data decoder 2024 and audio decoder 2026, advanced recording and playback features are provided, allowing simultaneous recordings of one or more programmes while a further programme is being viewed, and more general transfers to and from the hard disk to and from the display devices and/or inputs and outputs, all occurring in parallel.

The audio output 2038 and video output 2040 in the receiver/decoder are fed by the PCM mixer 2030 and audio DAC 2034, and the MPEG video decoder 2028, graphic engine 2032 and PAL/SECAM encoder 2036 respectively. Alternative or complementary outputs may of course be provided.

As used in this description, an application is preferably a piece of computer code for controlling high level functions of preferably the receiver/decoder 2000. For example, when the end user positions the focus of remote control 2080 on a button object seen on the screen of the television set (not shown) and presses a validation key, the instruction sequence associated with the button is run. Applications and the associated middleware are executed by the host processor 2002, with remote procedure calls (RPCs) being made to the digital TV coprocessor 2004 across the coprocessor bus 2006 as and when required.

An interactive application proposes menus and executes commands at the request of the end user and provides data related to the purpose of the application. Applications may be either resident applications, that is, stored in the ROM (or FLASH or other non-volatile memory) of the receiver/decoder 2000, or broadcast and downloaded into the RAM, FLASH memory or hard disk of the receiver/decoder 2000.

Applications are stored in memory locations in the receiver/decoder 2000 and represented as resource files. The resource files comprise graphic object description unit files, variables block unit files, instruction sequence files, application files and data files.

The receiver/decoder contains memory (not shown) divided into at least one RAM volume, a FLASH volume and at least one ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of Receiver/Decoder

Figure 5:
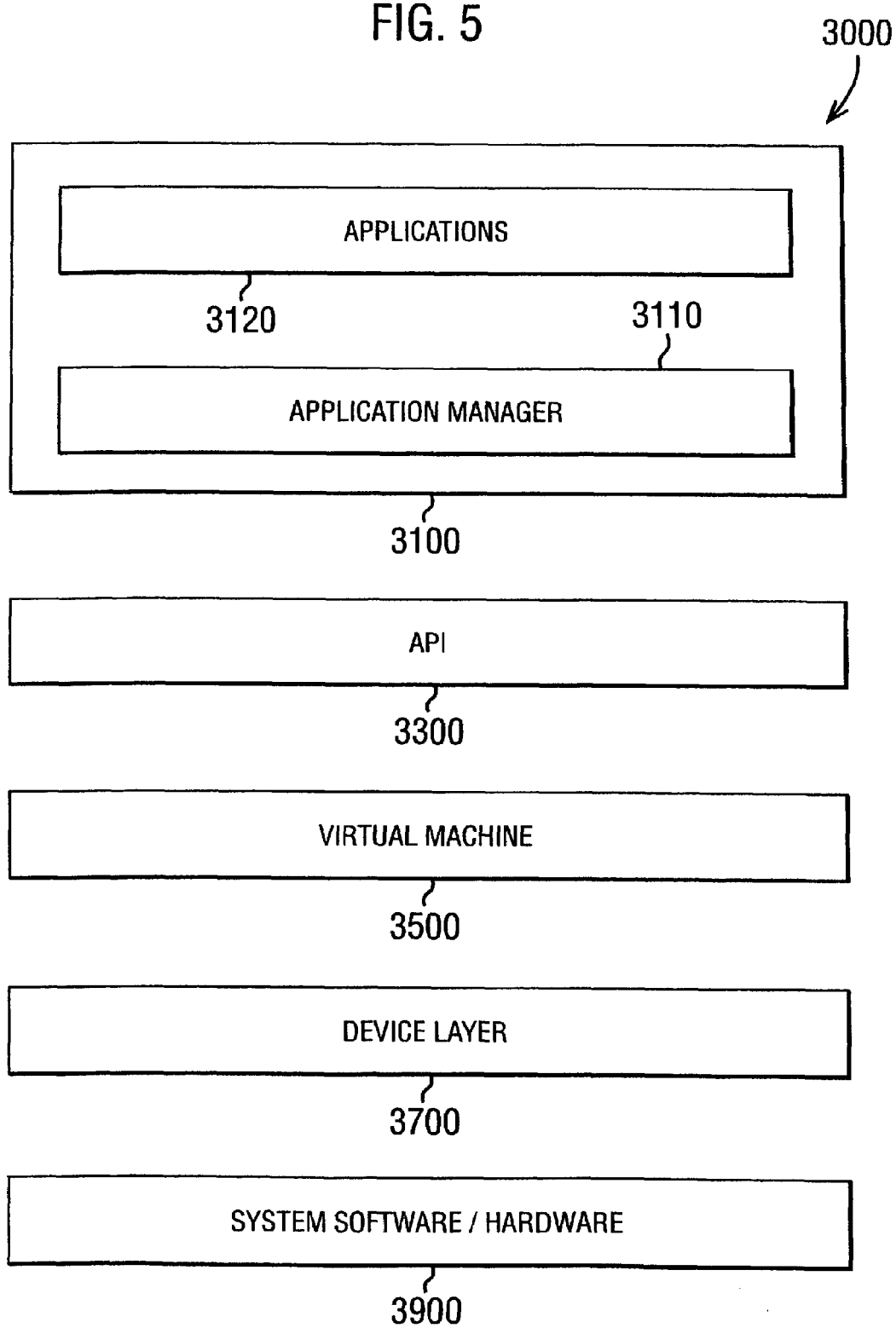
FIG. 5 is a diagram of the software architecture of the receiver/decoder.

With reference to FIG. 5, the software/hardware architecture 3000 of the receiver/decoder contains five software layers, organized so that the software can be implemented in any receiver/decoder and with any operating system. The various software layers are application layer 3100, application programming interface (API) layer 3300, virtual machine layer 3500, device interface layer 3700 (often abbreviated just to 'device layer') and system software/hardware layer 3900.

The application layer 3100 encompasses applications 3120 that are either resident in or downloaded to the receiver/decoder. They may be interactive applications used by customers, written in, for example, Java, HTML, MHEG-5 or other languages, or they may be applications used by the receiver/decoder for other purposes, for example for running such interactive applications. This layer is based on a set of open Application Programming Interfaces (APIs) provided by the Virtual Machine layer. This system allows applications to be downloaded to the hard disk, flash memory or RAM memory in the receiver/decoder on-the-fly or on demand. The application code can be transmitted in compressed or uncompressed format using protocols such as Data Storage Media Command and Control (DSMCC), Network File Server (NFS) or other protocols.

The API layer 3300 provides high-level utilities for interactive application development. It includes several packages that make up this high-level API. The packages provide all the functionality necessary to run interactive applications. The packages are accessible by the applications.

In a preferred embodiment the API is adapted for applications written in the Java, PanTalk or such similar programming languages. Furthermore, it can facilitate the interpretation of HTML and other formats, such as MHEG-5. Besides these features, it also includes other packages and service modules that are detachable and extensible as requirements dictate.

The virtual machine layer 3500 is composed of language interpreters and various modules and systems. This layer, managed by a kernel 3650 (not shown), consists of everything necessary to receive and execute interactive applications in the receiver/decoder.

The device interface layer 3700 includes a Device Manager and software devices (generally referred to herein as just 'devices'). Devices are software modules which consist of the logical resources necessary for management of external events and physical interfaces. The device interface layer, under the control of the Device Manager, manages communication channels between drivers and applications and provides enhanced error exception checking. Some examples of managed (hardware) devices are: card readers 3722 (not shown), modems 3730 (not shown), network 3732 (not shown), PCMCIA (Personal Computer Memory Card International Association), LED display and so on. Programmers do not have to deal with this layer directly, since the API layer controls the devices from above.

The system software/hardware layer 3900 is provided by the manufacturer of the receiver/decoder. Because of the modularity of the system and because services supplied by the higher-level operating system (such as event scheduling and memory management) are part of the virtual machine and kernel, the higher layers are not tied to a particular real-time operating system (RTOS) or to a particular processor.

Typically the virtual machine layer 3500, occasionally in combination with the device interface layer 3700 and/or API 3300, is referred to as the 'middleware' of the receiver/decoder.

Figure 6:
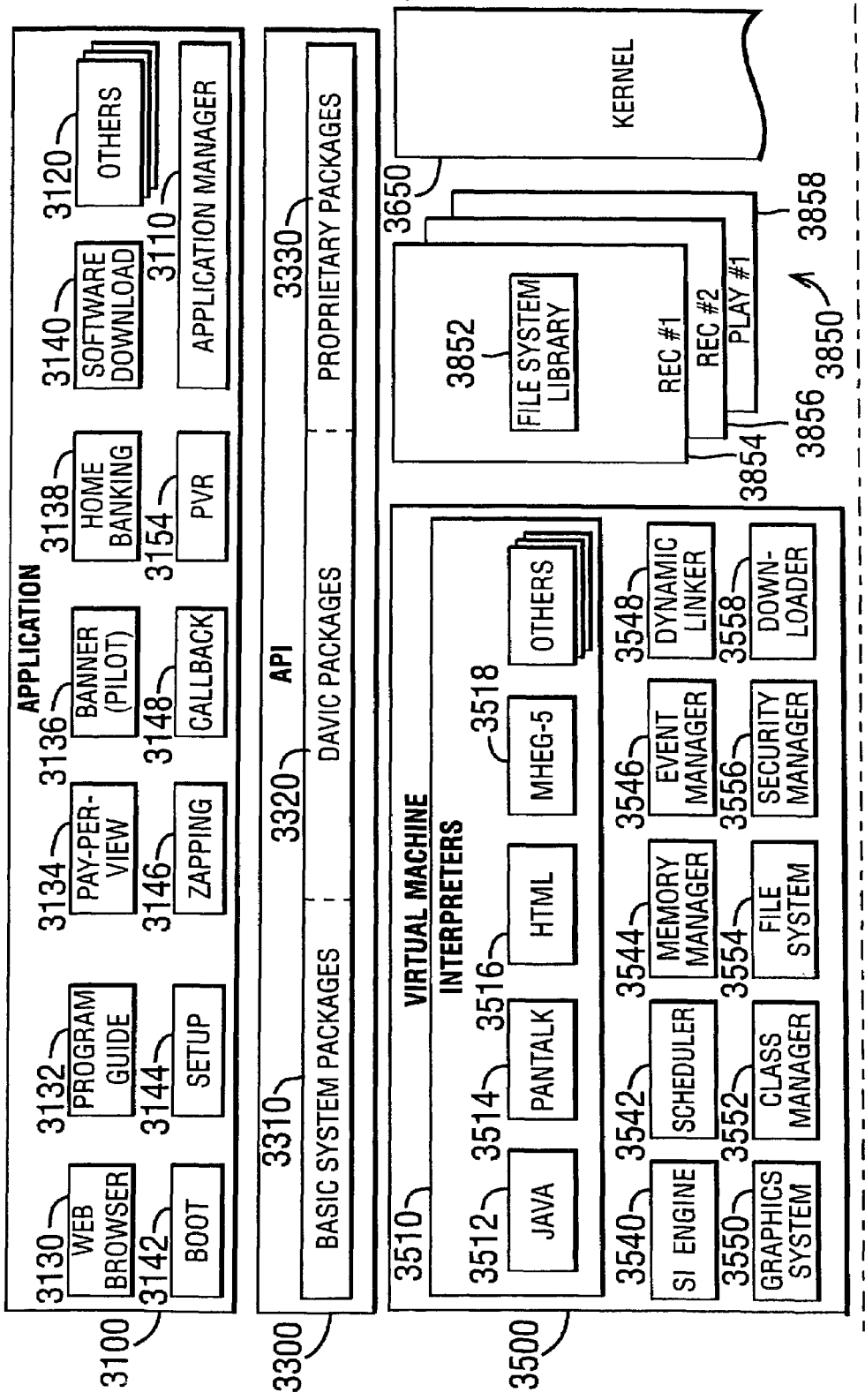
FIG. 6 is a diagram showing the top half of FIG. 5 in more detail.

With reference to FIG. 6 the software architecture of the receiver/decoder 3000 corresponding to the top half of FIG. 5 (comprising the application layer 3100, API layer 3300 and virtual machine layer 3500) will now be described in more detail.

Interactive applications are applications that the user interacts with, for example, to obtain products and services, such as electronic program guides, telebanking applications and games.

There are two types of application in the application layer 3100, plus the Application Manager 3110. There are interactive applications such as a Web Browser 3130 which can be added at any time as long as they conform to the API 3300, and there are resident applications which manage and support the interactive applications. The resident applications are substantially permanent and include the following:

Boot. The Boot application 3142 is the first application launched when the receiver/decoder is powered on. The Boot application first starts the Application Manager 3110, and then starts the "Manager" software modules in the virtual machine 3500, such as the Memory Manager 3544 and the Event Manager 3546.

Application Manager. The Application Manager 3110 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 3144 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 3146 is used to change channels using the Program-up, Program-down and numeric keys. When another form of zapping is used, for example, through a banner (pilot) application, the Zapping application is stopped.

Callback. The Callback application 3148 is used to extract the values of various parameters stored in the receiver/decoder memory and return these values to the commercial operator via modemmed back channel 1070 (not shown), or by other means.

Other applications in the application layer 3100 include a program guide application 3132, a pay-per-view application 3134, a banner (pilot) application 3136, a home banking application 3138, a software download application 3140 and a PVR (personal video recorder) application 3154 (see below).

As noted above, the Application Programming Interface (API) layer 3300 contains several packages. These include basic system packages 3310, used, for example, to access basic features of the virtual machine, DAVIC packages 3320, and proprietary packages 3330, used to access features of the software architecture unique to the principal software vendor.

Considered in more detail, the virtual machine 3500 includes the following:

Language Interpreters 3510. Different interpreters can be installed to conform to the type of applications to be read. These include Java interpreters 3512, PanTalk interpreters 3514, HTML interpreters 3516, MHEG-5 interpreters 3518 and others.

Service Information (SI) Engine. The SI Engine 3540 loads and monitors common Digital Video Broadcasting (DVB) or Program System Information Protocol (PSIP) tables and puts them into a cache. It allows access to these tables by applications which need the data contained in them.

Scheduler 3542. This module allows for pre-emptive, multithreaded scheduling with each thread having its own event queue.

Memory Manager 3544. This module manages the access to memory. It also automatically compresses data in memory when necessary and performs automatic garbage collection.

Event Manager 3546. This module allows events to be triggered according to priority. It manages timer and event grabbing and allows applications to send events to each other.

Dynamic Linker 3548. This module allows the resolution of addresses arising from native Java functions, loads native methods from a Java class downloaded into RAM and resolves calls from downloaded native codes towards ROM.

Graphics System 3550. This system is object-orientated and optimized. It includes graphic window and object management as well as a vectorial font engine with multi-language support.

Class Manager 3552. This module loads classes and resolves any class referencing problems.

File System 3554. This module is compact and optimized to manage a hierarchical file system with multiple ROM, flash, RAM and DSMCC volumes. Flash integrity is guaranteed against any incidents.

Security Manager 3556. This module authenticates applications and controls the access of applications to sensitive memory and other zones of the set-top box.

Downloader 3558. This module uses automatic data loading from a remote DSMCC carousel or through the NFS protocol, with downloaded files accessed in the same way as resident ones. Memory clear-up, compression and authentication are also provided.

Furthermore, the DAVIC resource notification model is supported so that client resources are efficiently managed.

A kernel 3650 manages the various different processes running in the virtual machine 3500 and device interface layer 3700 (not shown). For efficiency and reliability reasons, the kernel implements relevant parts of the POSIX standard for operating systems.

Under control of the kernel, the virtual machine (running Java and Pantalk applications) runs in its own thread, separate to other 'server' elements of the operating system, such as the mass storage server 3850 (not shown). Corresponding provisions, such as requiring Thread IDs to be passed as parameters in system calls, are also made in the API layer 3300 to allow the applications 3120 to benefit from the multithreaded environment.

By providing multiple threads, more stability can be achieved. For example, if the virtual machine 3500 ceases to operate for some reason, by suffering a crash or being blocked for a long time by an application trying to access a device, other time-critical parts of the system, such as the hard disk server, can continue to operate.

As well as the virtual machine 3500 and kernel 3650, a hard disk video recorder (HDVR) module 3850 is provided for handling the recording and playback functions of the hard disk 2210 or other attached mass storage component. The server comprises two separate threads 3854, 3856 handling recording, one thread 3858 for handling playback, and a file system library 3852 for interfacing with the mass storage components.

An appropriate one of the threads 3854, 3856, 3858 in the hard disk video recorder (HDVR) 3850 receives commands (such as a command to start recording a particular programme) from clients such as the personal video recorder (PVR) application 3154, in response to the user pressing a 'record' button, for example.

In turn, the thread in question then interacts with the service device 3736 (shown in FIG. 7) to set up and synchronise the parts of the receiver/decoder handling the bitstream to be recorded or played back. In parallel, the thread also interacts with the file system library 3852 to coordinate the recording or playback operation at appropriate places on the hard disk 2210 (not shown).

The file system library 3852 then sends commands to the mass storage device 3728 (also shown in FIG. 7) which tell the mass storage device 3728 which sub-transport stream (STS) to transfer (via a FIFO buffer), and on which hard disk target the stream should be stored. Allocation of clusters on the hard disk and general file management is carried out by the file system library 3852, the mass storage device itself being concerned with lower level operations.

The service device 3736 mentioned above is unique amongst the devices in that it does not relate to a physical component of the receiver/decoder. It instead provides a high level interface which groups together in a single 'instance' the various sets of tuner, demultiplexer, remultiplexer and hard disk devices in the receiver/decoder, freeing higher level processes from the difficulties of coordinating the various sub-devices.

Figure 7:
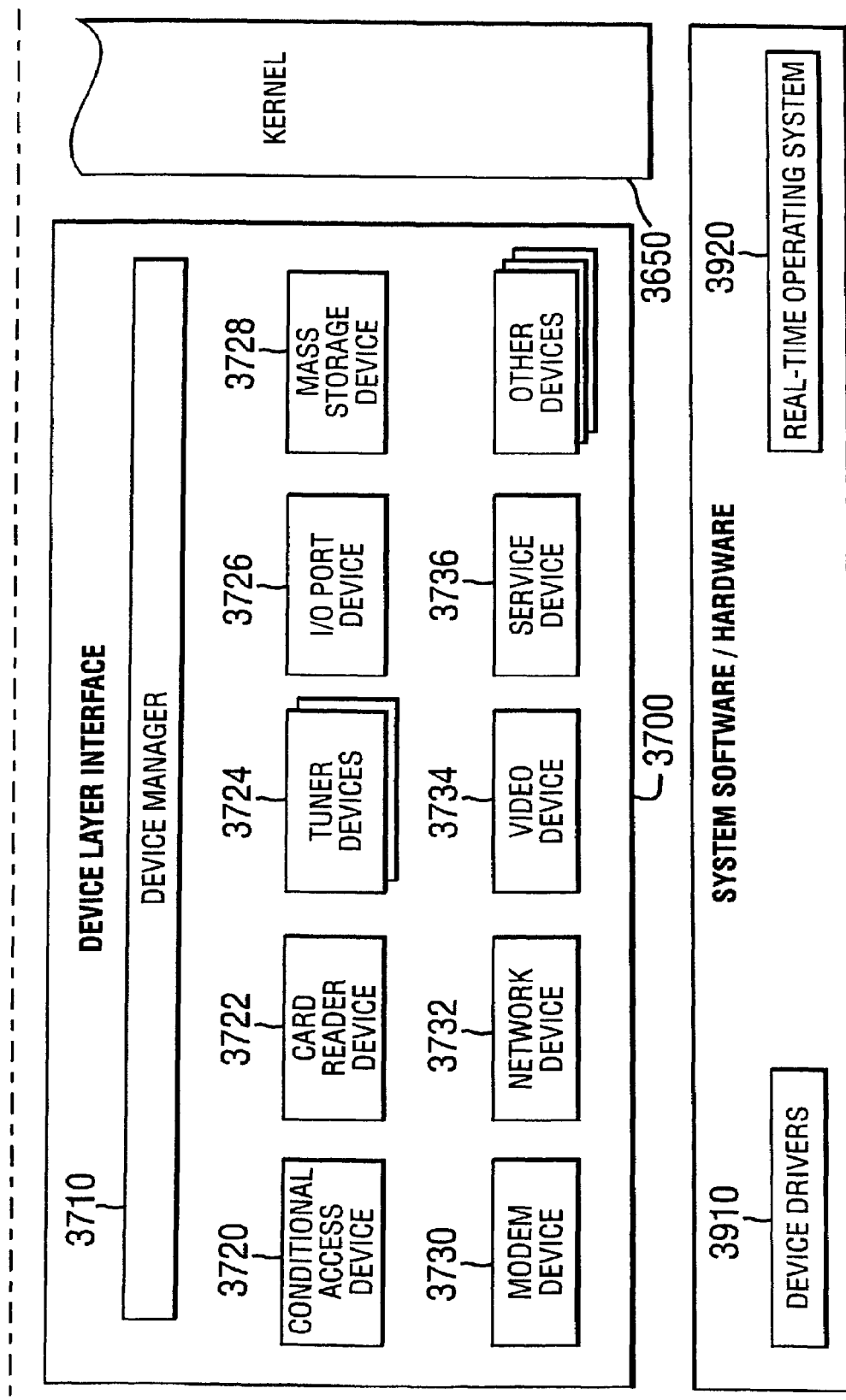
FIG. 7 is a diagram showing the bottom half of FIG. 5 in more detail.

With reference to FIG. 7 the software architecture of the receiver/decoder 3000 corresponding to the bottom half of FIG. 5 (comprising the device interface layer 3700 and the system software and hardware layer 3900) will now be described in more detail.

Further devices provided in the device layer include the conditional access device 3720, tuner devices 3724 corresponding to the two (or potentially more) tuners 2016, 2018 of FIG. 4, the video device 3734, the I/O port device 3726, and the service device 3736 and mass storage device 3728 mentioned above.

In broad terms, a device can be regarded as defining a logical interface, so that two different devices may be coupled to a common physical port. Certain devices may communicate among themselves, and all devices also operate under the control of the kernel 3650.

Before using the services of any device, a program (such as an application instruction sequence) has to be declared as a "client", that is, a logical access-way to the device or the device manager 3710. The manager gives the client a client number which is referred to in all accesses to the device. A device can have several clients, the number of clients for each device being specified depending on the type of device. A client is introduced to the device by a procedure "Device: Open Channel". This procedure assigns a client number to the client. A client can be taken out of the device manager 3710 client list by a procedure "Device: Close Channel".

The access to devices provided by the device manager 3710 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

Figure 8:
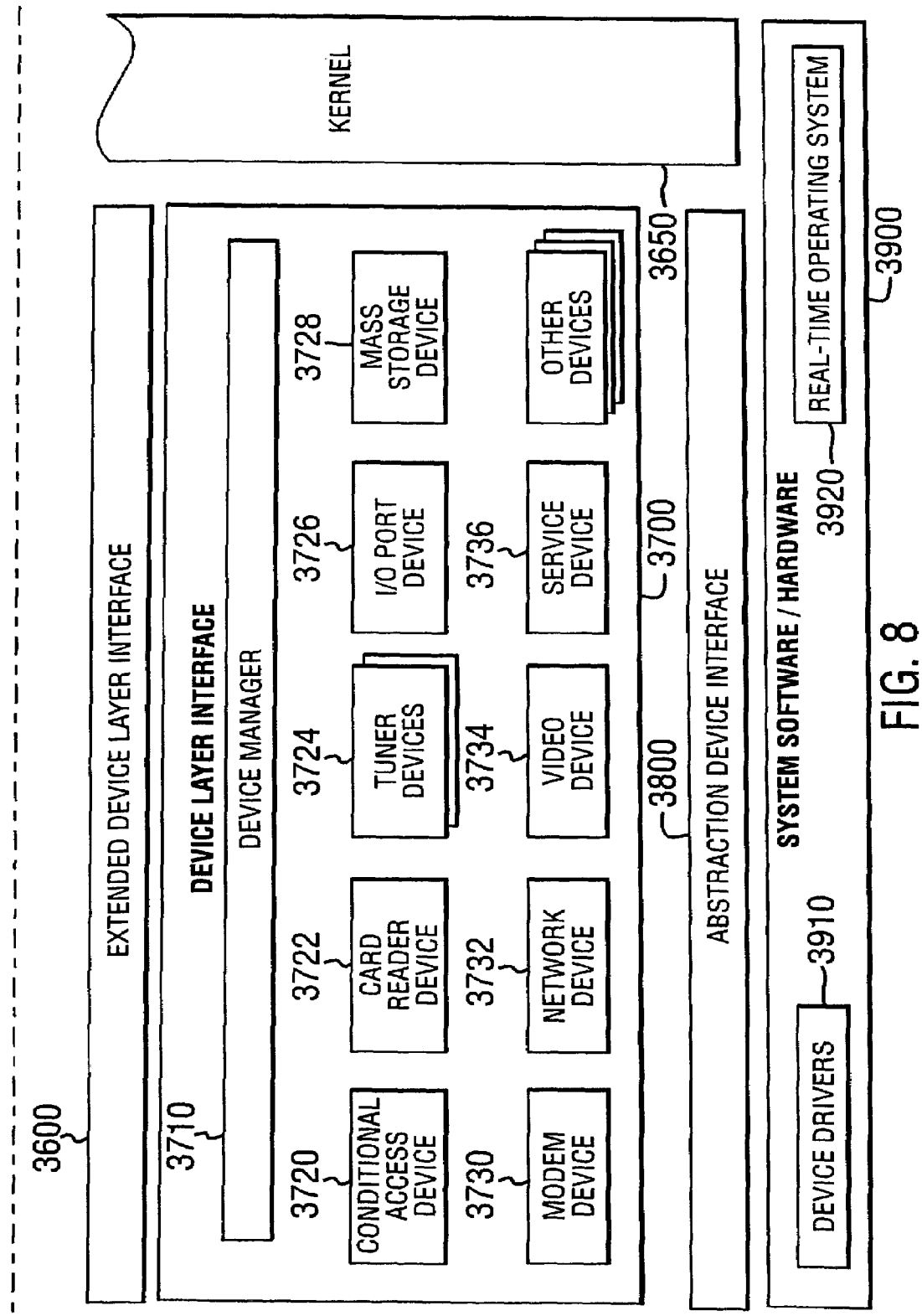
FIG. 8 is a diagram showing an alternative embodiment of the bottom half of FIG. 5.

In a second embodiment of the receiver/decoder, the lower half of the architecture of the receiver/decoder is replaced by the layers shown in FIG. 8.

In this embodiment, an extended device layer interface (EDLI) 3600 is provided between the virtual machine 3500 (not shown) and the device interface layer 3700, and an abstraction device interface 3800 is provided between the device interface layer 3700 and the system software/hardware layer 3900. Otherwise, like parts are indicated with like reference numerals.

The extended device layer interface (EDLI) 3600 provides a dedicated interface between the virtual machine 3500 and the device interface layer 3700 and generally provides multithreading support to the device interface layer. Functions of the EDLI include routing asynchronous events to the appropriate thread in the middleware (since the device interface layer need not itself support multithreading) and routing messages between threads.

The abstraction device interface 3800 provides a further interface between the device interface layer 3700 and the device drivers 3910 in the system software/hardware layer 3900. By providing such an interface, the large and complex device layer 3700 can be made hardware independent to a greater degree.

Content Management and Protection System (CMPS)

Figure 9:
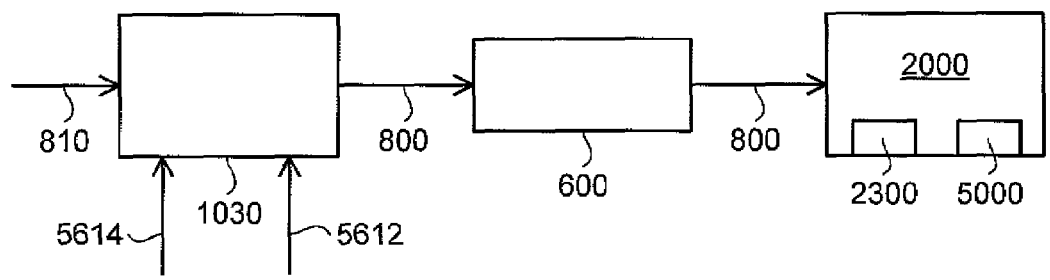
FIG. 9 is an overview of a content management and protection system.

With reference to FIG. 9, the content management and protection system (CMPS) 2300 mentioned above is distributed between the broadcast centre 1000 and the receiver/decoder 2000. The receiver/decoder component of the CMPS is provided in the form of a physical smartcard (with an associated smartcard reader) and a virtual smartcard, both under the control of a virtual smartcard manager (as will be described in more detail later), but in variants of the preferred embodiment the receiver/decoder component of the CMPS is implemented solely in software or in hardware, or further permutations of both. The CMPS can ensure that only authorized users can record and playback content, in accordance with predefined usage rules. It may further ensure that other rules defined by the content owner and/or distributor are adhered to, such as copy control and time-shifting constraints.

An important part of the content management and protection system is the special Usage Rules Message (URM) which contains content management information relating to given content (such as a programme or transmission) and is transmitted before such a programme or transmission. In essence, the Usage Rules Messages impose usage constraints on the playback and reproduction of the content, and can be directed only to specific portions of the content, such as separate 'chapters' within a programme, or to the content as a whole. Typical usage rules include restrictions on time-shifting, fast-forwarding, number of times a recording can be played back, and available reproduction modes. Another important feature, which will be described in more detail below, is that URMs relating to a given programme may be sent independently (from different locations and at different times) from the corresponding content or conditional access information.

A second class of message, the CMPS Entitlement Management Message (CMPS EMM, or CMP_EMM), is provided to transmit access rights to the CMPS. The CMPS EMM is equivalent to the conditional access entitlement management message (EMM, or CAS_EMM) referred to elsewhere, but the transmitted access rights relate to the local storage of programme data rather than broadcast programme data, as with the 'conventional' EMM.

In the preferred embodiment, shown in FIG. 9, the multiplexer and scrambler 1030 receives the CMPS EMMs 5614 and URMs 5612, multiplexes them with the bitstream containing the unscrambled content (programme data) 810 and broadcasts the resulting scrambled content 800 via the broadcast system 600. The receiver/decoder then receives the scrambled content 800, and removes and passes the CMPS EMMs and URMs to the CMPS 2300 and conditional access system 5000 if necessary. In the preferred embodiment, however, the CMPS EMMs and URMs are dealt with internally by the CMPS.

The URMs are encrypted with a URM exploitation key, which in a variant of the preferred embodiment is the same as the ECM exploitation key. An equivalent of the URM exploitation key is maintained in the receiver/decoder CMPS smartcard (not shown) to allow the URMs to be decrypted. In a further variant, the URMs are not encrypted, but cryptographically signed to ensure data integrity. In yet another variant, values contained within the URMs are used as a seeding value to derive, potentially in combination with other information, a cryptographic key. Certain encrypted units such as the CMP_EMMs can be encrypted by such a key (or a derivation thereof), meaning that any tampering with the URM will prevent the decryption of the CMP_EMMs, for example.

As mentioned above, usage rights which allow a user to record and/or playback using the receiver/decoder are provided in the form of CMPS Entitlement Management Messages (CMPS EMM or CMP_EMM); CMPS EMMs can have the same structure as conventional EMMs, but are generally more key-oriented—a CMP_EMM typically embeds a key associated with a content or service. Rights to playback recorded content in general depend on the commercial rules encoded in the URMs and also on the already acquired usage rights. Such rights can be granted in return for one-off payments (impulse purchases) or subscriptions, for example. Various levels of access rights can also be granted in relation to any content, whereby a user could, for example, pay a first fee in exchange for the rights to replay content once, or pay a second, higher, fee in return for unlimited replays. CMP_EMMs are typically stored in the receiver/decoder CMPS smartcard, but may be stored elsewhere, such as in securely encrypted areas on a hard disk, for example.

In the preferred embodiment, rights to replay a recording can either be obtained after the recording is made (the 'pay-per-view' model), or prior to the recording (the 'subscription' model). In the former case, after recording the content, the user instructs the conditional access system that he wishes to obtain the rights to playback the content. If the instruction is authorised by the subscription management system, the appropriate CMPS Entitlement Management Message ("CMP_EMM") is then transmitted to the receiver/decoder via the bidirectional link.

One of the many advantages provided by the CMPS system is that the access rights for recording and playing back programmes are entirely independent of the access rights for simply viewing the programmes, as in conventional systems. Thus, one could have the situation where one could view a programme but not record it and play it back, and conversely one could be unable to view a programme, but one could record it, obtain the necessary rights and then play it back.

Figure 10:
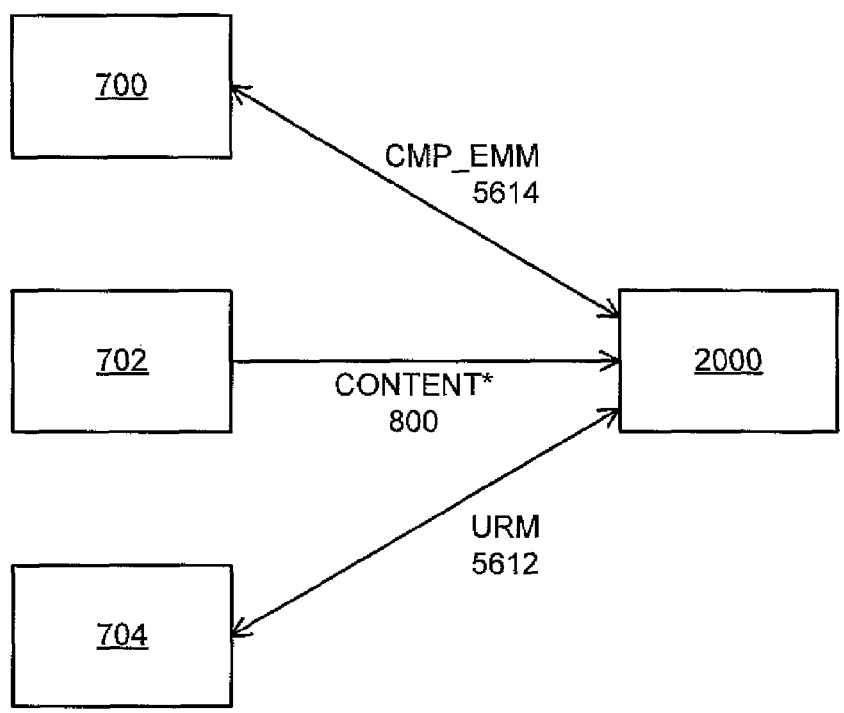
FIG. 10 is an overview of a distribution system using the content management and protection system.

In a variant of the preferred embodiment particularly typical of an internet distribution model, shown in FIG. 10, the scrambled content ("CONTENT*"), CMPS EMM ("CMP_EMM") and URMs ("URM") are all delivered independently to a receiver/decoder 2000, from a first party 700, second party 702 and third party 704. The first, second or third party may be, for example, a multi access portal (MAP), and the scrambled content 800, CMPS EMMs 5614 and URMs 5612 may each be delivered via the broadcast stream, other broadband connection or dial-up connection, for example. Typically, a programme provider (the second party 1202) sends programme content ("CONTENT") to the multiplexer/scrambler, where the scrambled content 1300 (CONTENT*) is generated and then transmitted to the receiver/decoder 2000 in the usual fashion. The independence of information delivery illustrated above and in the preferred embodiment reflects the fact that the various roles of content distribution, commercial offer presentation and usage rights delivery are often played by different actors.

Figure 11:
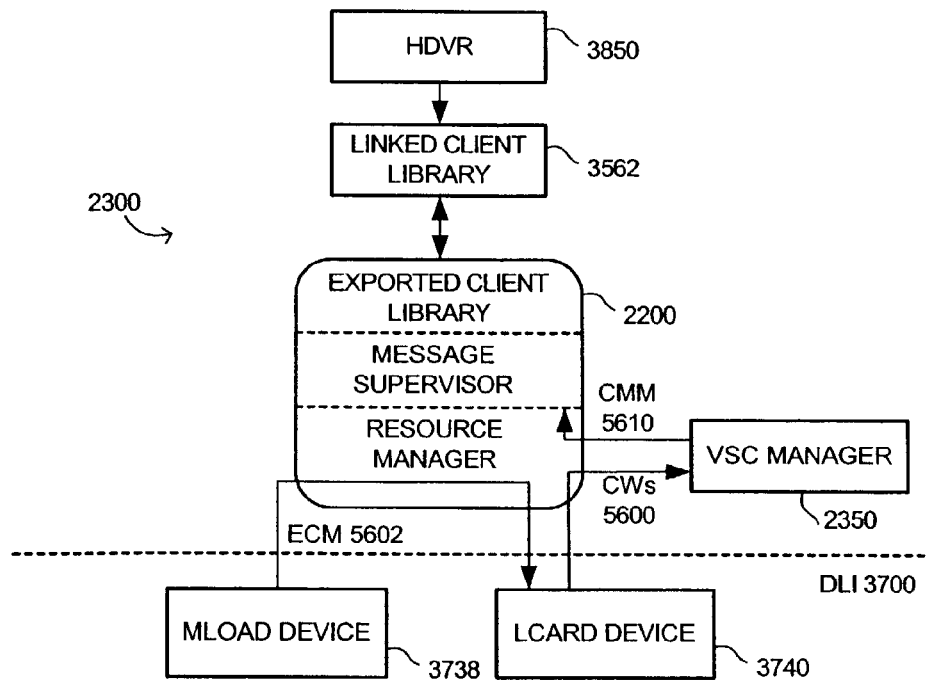
FIG. 11 is a schematic of an implementation of the content management and protection system in a receiver/decoder, arranged to record data.
Figure 12:
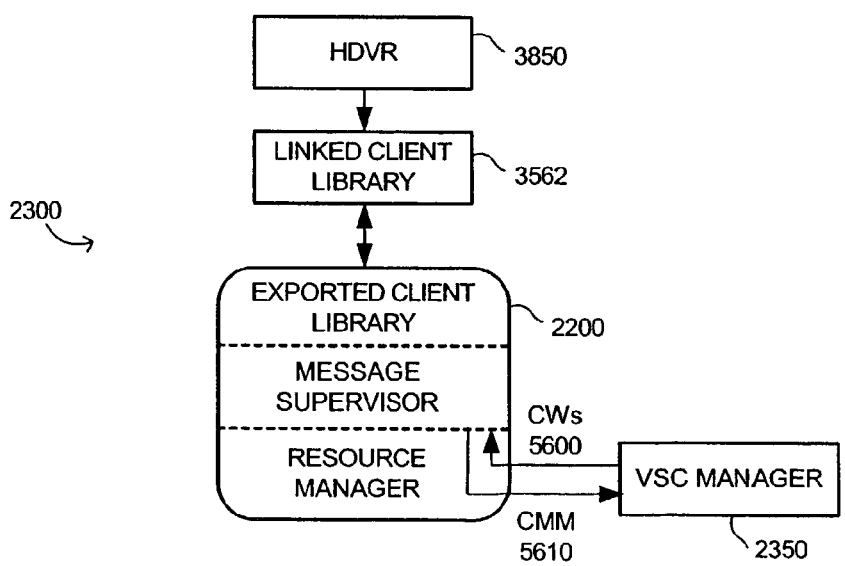
FIG. 12 is a schematic of the implementation of the content management and protection system in a receiver/decoder, arranged to play back data.

With reference to FIGS. 11 and 12, the implementation at the receiver/decoder 2000 of recording and playing back content respectively using the CMPS 2300 will now be described.

In FIG. 11, which shows the configuration of the CMPS in recording mode, a CMPS server module (core) 2200, comprising an exported client library (API), message supervisor and resource manager, is shown, in addition to a CMPS linked client library 3562, virtual smartcard manager (VSC manager) 2350, MLOAD device 3738 LCARD device 3740 and HDVR module 3850. The device layer interface 3700 is also shown.

The CMPS core 2200 is provided in the receiver/decoder middleware and interfaces with the HDVR module 3850 via the linked client library 3562. The CMPS core 2200 also interfaces with the MLOAD device 3738, the LCARD device 3740 (housing the conditional access smartcard), and the RCARD device 3442 (not shown, which houses an optional CMPS smartcard).

In operation of the CMPS system in record mode, described in more detail later, ECMs 5602 received in the programme data stream are isolated by the MLOAD device and then routed by the CMPS resource manager to the conditional access smartcard. Control words 5600 derived from the ECMs are then routed to the virtual smartcard manager 2350, in addition to corresponding URMs and CMPS EMMs where appropriate (which are preferably also received in the programme data stream, but may be received via other routes).

The virtual smartcard manager 2350 then manages the conversion of the control words and other data into CMMs 5610 using a real or virtual CMPS smartcard 2400 (not shown) as appropriate, and forwards the CMMs back to the CMPS core for further processing. In the preferred embodiment, secure authenticated channels (SACs) are used between the various software and hardware components to transfer the control words and other sensitive data. The virtual smartcard manager 2350 and virtual smartcard 2400 are described later in more detail.

The CMMs are then passed to the HDVR controller 3350 so that they can be stored on disk along with the corresponding content data. In the event that the ECMs cannot be decrypted (typically because the user does not have the appropriate rights), the ECMs themselves are stored in the CMM structure in place of the control words to allow future conversion of the ECMs into control words at a later date when the access rights become available. The above encapsulation of ECMs in CMMs is also described in more detail later.

In a variant of the preferred embodiment, the content may be descrambled and rescrambled at the recording stage, in which case new content keys (equivalent to local control words) are generated and stored in the CMMs. In a further variant, the content is super-scrambled (that is, scrambled further by a typically more powerful encryption method), which requires a second level of CMMs containing the further scrambling/encryption keys. In this case, Triple DES could be used with 168 bit key length as a suitably more powerful encryption method.

In FIG. 12, which shows the configuration of the CMPS in playback mode, the CMPS core 2200, comprising the exported client library, message supervisor and resource manager, is shown, in addition to the CMPS linked client library 3562, virtual smartcard manager (VSC manager) 2350, and HDVR module 3850.

In operation of the CMPS system in playback mode, described in more detail below, CMMs forwarded by the HDVR module 3850 are decoded under the control of the virtual smartcard manager 2350 to produce the desired control words, which are then forwarded back to the HDVR module 3850. If, as mentioned above, the CMM contains encapsulated ECMs rather than decoded control words, the CMPS will again attempt to decrypt the ECM, filling the CMM with the appropriate control words if successful.

Figure 13:
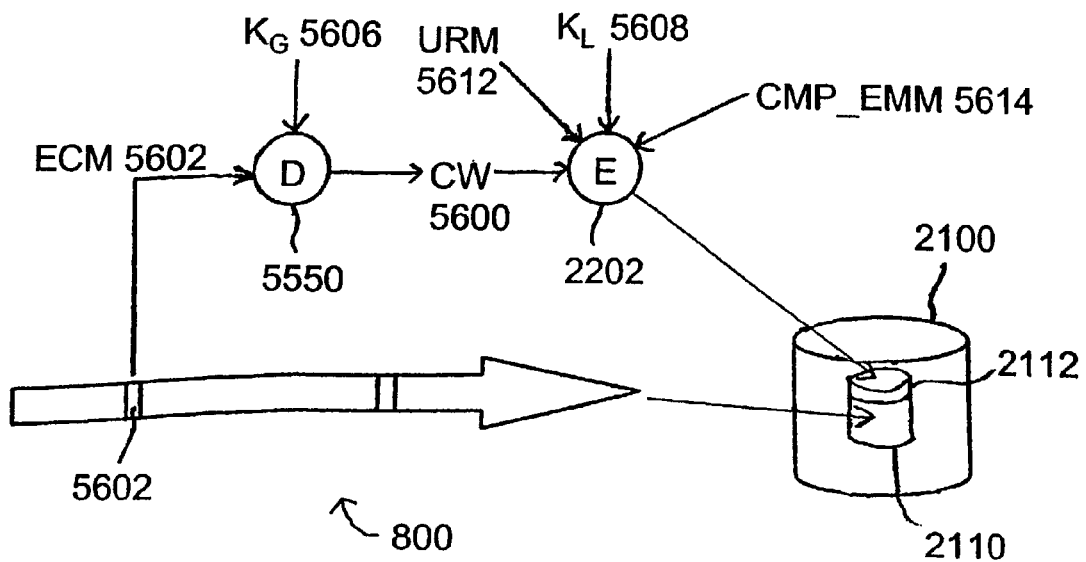
FIG. 13 is an illustration of the recording of data using the content management and protection system.

The process of recording content to disk will now be described from a more functional perspective, as illustrated in FIG. 13. In FIG. 13, each ECM 5602 is passed to a decryption stage 5550 in the conditional access smartcard, where it is decrypted using a global exploitation key $K_G$ 5606. The decrypted control word 5600 then passes to an encryption stage 2202 in the CMPS smartcard, where it is combined into a content management message (CMM) with the corresponding URM 5612 and CMPS EMM 5614, and then re-encrypted as a whole using a local exploitation key $K_L$ 5608. The unaltered, scrambled content and the resulting plurality of CMMs are then stored in a content portion 2110 and management data portion 2112 respectively within a single file in the hard disk 2100. In a variant of the preferred embodiment, separate files are used to store each portion.

Figure 14:
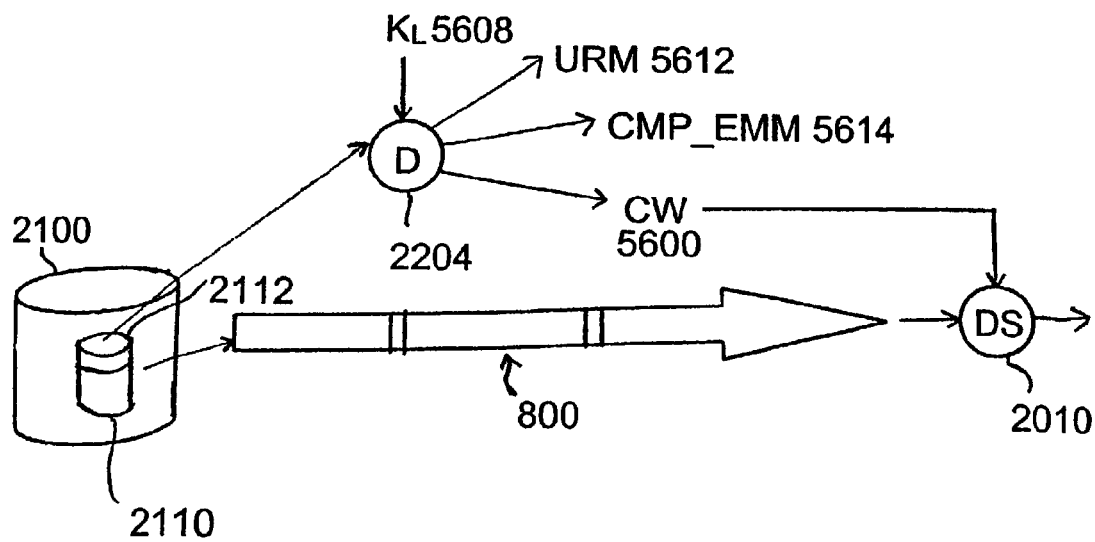
FIG. 14 is an illustration of the playing back of data using the content management and protection system.

In the reverse process of playing back content from disk, illustrated again in FIG. 14, the scrambled content 1300 is read from the content portion 2110 in the file on the hard disk 2100 and fed into the descrambler 2010. In parallel, CMMs are read from the separate management data portion 2112 and fed into a decryption stage 2204 in the CMPS smartcard. The CMMs are decrypted with the local exploitation key 5608 and then split into the URM 5612, CMPS EMM 5614 and control word 5600. If the CMPS module decides that the user is entitled to view the material (on the basis of the URM and CMPS EMM), the control word 5600 is then sent to the descrambler 2010 at the appropriate time to allow the content to be descrambled.

Additionally, the system provides means for generating and storing all of the master and dependent encryption and/or authentication keys required for all of the sessions, whilst retaining as much security and speed as possible. The processes involved in both the generation and storage of these keys will be described later in more detail.

Recording Using the HDVR

The process of recording using the HDVR 3850 will now be described in more detail.

At the time of recording a programme, HDVR generates a file whose structure is mainly in two parts: management data (for example, hdvr_file.management_data) and content itself (for example, hdvr_file.content_data).

The first part of the file corresponds (among other things) to local messages (Content Management Messages—CMMs) generated and handled by the CMPS, which contain the usage rules of the content as well as the associated unscrambling keys (the control words in other words). The first part also comprises an index table comprising indices mapping time offsets in the bitstream to data offsets in the file.

The second part is made up of a partial transport stream (pTS) corresponding to the various components of a given programme (video, audio, subtitles, and so on) and remains scrambled, as broadcast, in the common scrambling format DVB_CS. In variants of the preferred embodiments, the management data and content are stored in at least two separate files. In further variants, the content is either descrambled and rescrambled (preferably with a local key unique to the given receiver/decoder) or super-scrambled with a further, more secure, level of encryption (such as Triple DES with suitably large key lengths).

The CMPS takes charge of synchronisation with its own management and control messages to create the CMM in each encryption period. This CMM is then sent to the HDVR for insertion into the hdvr_file.management_data part. The CMPS also communicates a certain amount of information regarding the management of the content (hdvr_data), such as the start points of chapters or the authorised maximum extent of recording in time-shift mode.

Figure 15:
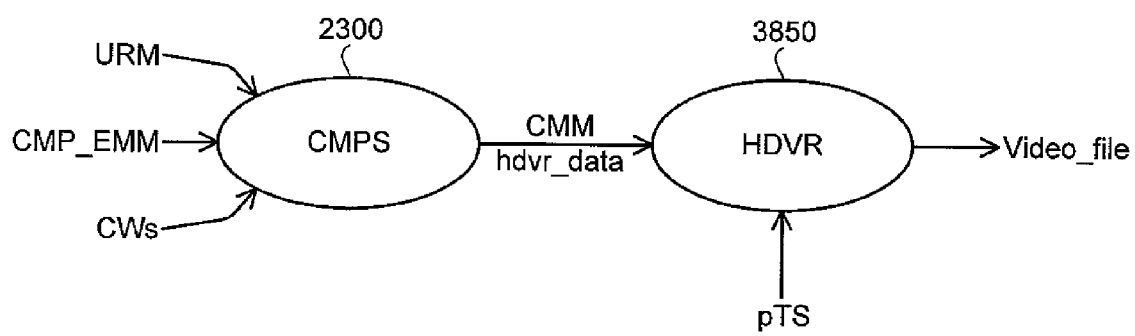
FIG. 15 is an illustration of the relationship between the content management and protection system and a hard disk video recorder.

This is illustrated schematically in FIG. 15. The URM, the CMP_EMM and the CWs are input to the CMPS. hdvr_data is passed from the CMPS 300 to the HDVR 350.

As mentioned above, the hdvr_file.management_data part of the file also comprises an index table comprising indices mapping time offsets in the bitstream to data offsets in the file. Two types of indices are included in the index table, HDVR indices, which are inserted automatically by the HDVR, and User indices, which are inserted upon command of a user.

The HDVR indices are positioned by the HDVR at intervals corresponding to periodic time offsets in the bitstream and are used as play entry points in the recorded file. In preferred embodiments, HDVR indices are generated by an HDVR automatically during the recording of a programme.

The User indices are also play entry points, and are set by a user at the time of recording of a programme or during playback of a recorded programme The Index table also comprises pointers mapping each HDVR and User index to an appropriate CMM, enabling decryption of the stored bitstream at the points indexed by then HDVR and User indices.

Processing recorded content, for instance searching for points in a file, or a corresponding bitstream, and "trick mode" operations such as fast forwarding, rewinding, and skipping make use of HDVR and User indices stored in the index table.

Playback Using the HDVR

The process of playing back content recorded using the HDVR 3850 will now be described in more detail.

At the time of using a recorded content, the CMPS ensures the validity of the associated rights by comparing the usage rules presented in the recorded CMM with the rights acquired by the subscriber and stored either in the CMPS smartcard or in a secure location inside the receiver/decoder (under the control of the virtual smartcard). This mechanism preferably remains clear for the HDVR application, apart from possible error messages (status) describing an invalid action in response to a request. Certain of the messages are preferably in addition relayed to the user using a man-machine-interface application, notably invalid actions on a remote control (for example, when the "trick" mode fast_forward is not authorised in a sequence, a warning is displayed on the screen).

To facilitate navigation within the content, it is possible to reload the descrambler with new CWs without being limited by the handling time inherent in the CMPS Smartcard. With this aim the HDVR application is able to ask the server to pre-process a certain number of CMMs before the effective use of the CWs which they contain. To do this, HDVR generates different buffers of the CMMs associated with chapters, index, and encrypting periods either side of the current position. At the request of the CMPS, the HDVR in addition retrieves the updated CMM to be reinserted in the hdvr_file.management_data part of the video file.

The principal data required by the HDVR is made up of navigation and usage constraint information (CMM.navigation and CMM.hdvr_rules) compared to the content use (labels of the start of chapters, navigation constraints, maximum extent of recording and so on) as well as the state of the CMM buffers submitted for handling at the CMPS server. Certain management information (hdvr_data) may be obtained from the URMs at the time of content recording (typically labels of the start of chapters) in the case where the information is conveyed in clear within the URM. To avoid overloading the hdvr_file_management_data part of the video file, other data, such as information about usage constraints (navigation, moral codes of chapters and so on) may be communicated by the CMPS at the time of playback of the content via the CMM.

The protocols for message exchanges, and in particular the relevant data structures, will now be described.

A certain amount of data taking place within the exchange protocols between the HDVR and CMPS is specified. They concern mainly the CMM_message messages transporting the CMM as well as the navigation information and constraints on content usage. The structure is as follows:

| Data Structure | Description |
| --- | --- |
| struct CMM_message { | |
|   struct CMM, | all of the CMM to be stored |
|   struct CMM.navigation, | data relating to navigation |
|   struct CMM.hdvr_rules | data relating to constraints |
| } | |

The CMM contains in its turn different structures which are detailed in the following.

The CMM_message is in particular composed of information concerning navigation within the content. Contrary to the CMMs in which navigation and constraint data may be encrypted, these are presented in clear in the CMM_message so as to be interpreted directly by the HDVR. The general structure of the CMM is given (independently of its encoding and signature) below:

| Data Structure | Description |
| --- | --- |
| struct CMM{ | |
|   struct CMM.navigation, | data relating to navigation |
|   struct CMM.hdvr_rules, | data relating to constraints |
|   struct CMM.content_key, | content keys (encoded) |
|   struct CMM.private_data | private data (usage rules) |
| } | |

Navigation data within the content refer to headings and are given below:

| Data Structure | Description |
| --- | --- |
| struct CMM.navigation{ | |
|   total_chapter_number, | total number of chapters of content |
|   chapter_index | chapter number |
| } | |

Data concerned with content usage restrictions in terms of invalid actions and time-shifting constraints are presented below:

| Data Structure | Description |
| --- | --- |
| struct CMM.hdvr_rules{ | |
|   trick_mode_bitmap, | invalid video recorder actions |
|   time_shifting_duration, | maximum recording length |
|   content_rating | moral level (of current chapter) |
| } | |

Internal Structure of the CMPS

Figure 16:
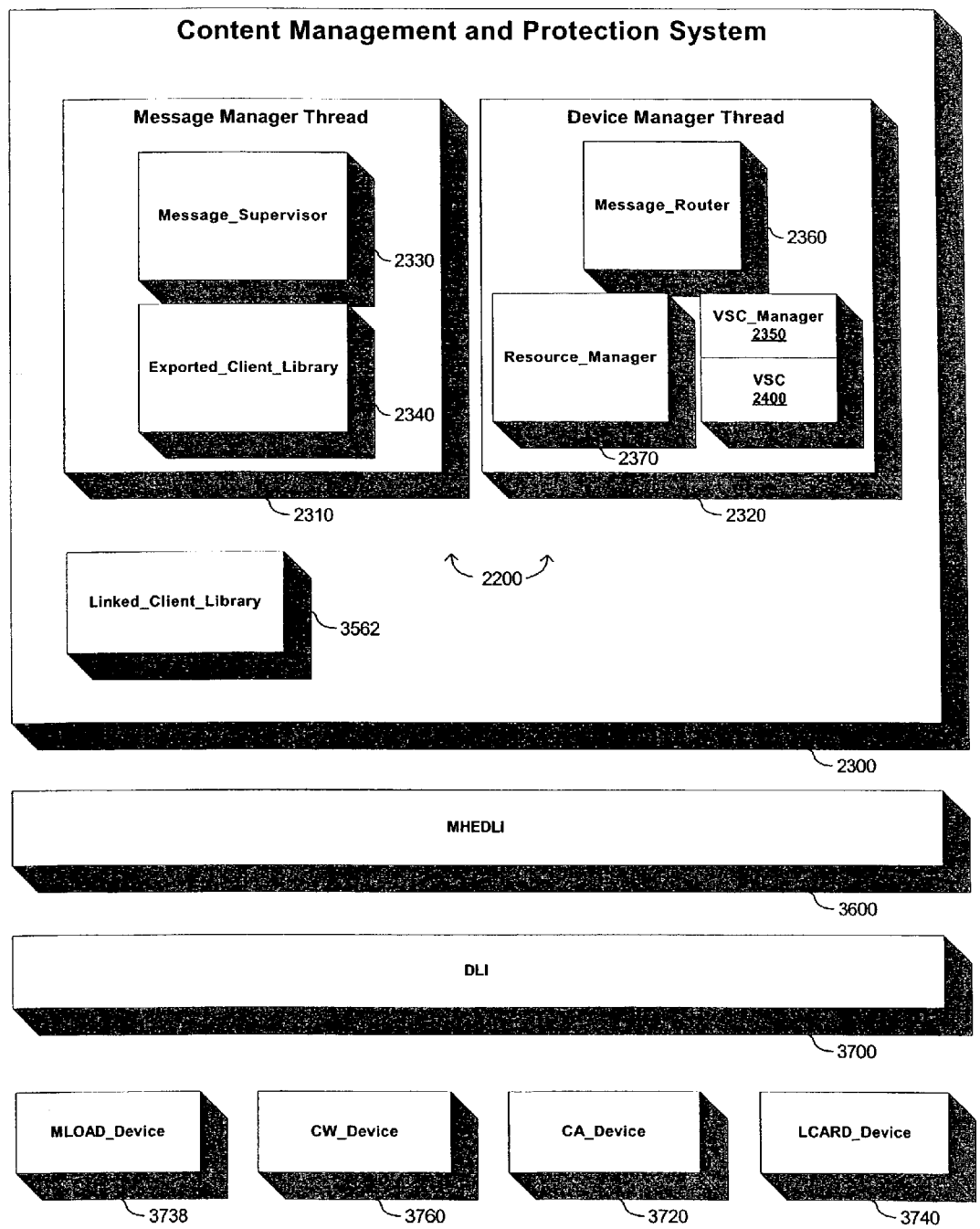
FIG. 16 is a schematic in more detail of the content management and protection system.

The CMPS will now be described in more detail with reference to FIG. 16. As also shown in FIGS. 11 and 12, the CMPS comprises a CMPS core 2200 and a linked client library 3562. The CMPS core 2000 itself comprises a CMPS message manager thread 2310 and a CMPS device manager thread 2320.

In overview, the CMPS message manager thread provides an interface to the functionality of the CMPS for applications (for example an HDVR 3850) running on a receiver/decoder, and the CMPS device manager thread 2320 interfaces with the various relevant devices (such as the MLOAD Device, CW Device, CA Device, LCARD Device, and so on).

The linked client library 3562 contains functions required to initialise the CMPS. In particular, the linked client library provides functions for creation of the CMPS message manager 2310 and CMPS device manager 2320 threads.

The CMPS message manager thread 2310 comprises an exported client library 2340 and a message supervisor module 2330.

The exported client library 2340 specifies the application messages which are supported by the CMPS, and the message supervisor module 2330 receives such messages and verifies that they are valid (returning an error if this is not the case). The message manager thread 2310 supports both synchronous and asynchronous messaging.

The functionality of the device manager thread will now be described in more detail.

As mentioned previously, the CMPS device manager thread 2320 comprises a message router module 2360, a resource manager 2370, a virtual smartcard (VSC) 2400 and a virtual smartcard manager (VSC manager) 2350. The virtual smartcard and virtual smartcard manager are described in more detail later.

The message router module 2360 handles the queuing (as appropriate) and routing of messages within the device manager thread 2320. When the message supervisor 2330 of the message manager thread 2310 receives a valid application message, it sends a corresponding asynchronous application message to the message router 2360. The message router 2360 then verifies that the received application message is valid (and raises an error if this is not the case) and then passes the message to the resource manager 2370 for further processing. Once such an application message has been processed by the resource manager 2370, a response message is passed back to the appropriate client via the message router 2360, message manager thread 2310.

Communication between the message manager 2310 and device manager 2320 threads, and between the resource manager 2370 and devices, are effected via the EDLI 3600 described above.

As mentioned above, the resource manager 2370 communicates with various devices, including:

The MLOAD Device 3738 is used extract the relevant conditional access data (such as ECMs, EMMs, and so on) from the decoded MPEG stream.

The CA Device 3720 is used to configure the ECM Manager (in the case of recording under the subscription model) and, if necessary, to change PIDs in the association table (such association table providing a correspondence between the various components making up a programme and the PIDs of their associated ECMs).

The CW Device 3760 is used to insert control words into the descrambler.

The LCARD Device 3740 is used to communicate with the conditional access smartcard.

Session Management

Communication between the CMPS device manager thread 2320 and clients of the CMPS (such as the HDVR) is achieved using sessions. Between the CMPS device manager and a client, two types of session are provided: recorder and player. As described in more detail below, new sessions are created by the CMPS device manager thread 2320 in response to suitable exchanges of messages.

The recording of content is encapsulated in a recorder session, and the playback of stored content is encapsulated in a player session. As described earlier, FIG. 11 illustrates in overview the typical data flow for a recording session, and FIG. 12 illustrates in overview the typical data flow for a player session. At any one time, the CMPS can handle one player session and two recorder sessions, although in variants of the preferred embodiment, further sessions of both types are provided in accordance with relevant hardware considerations.

Figure 17:
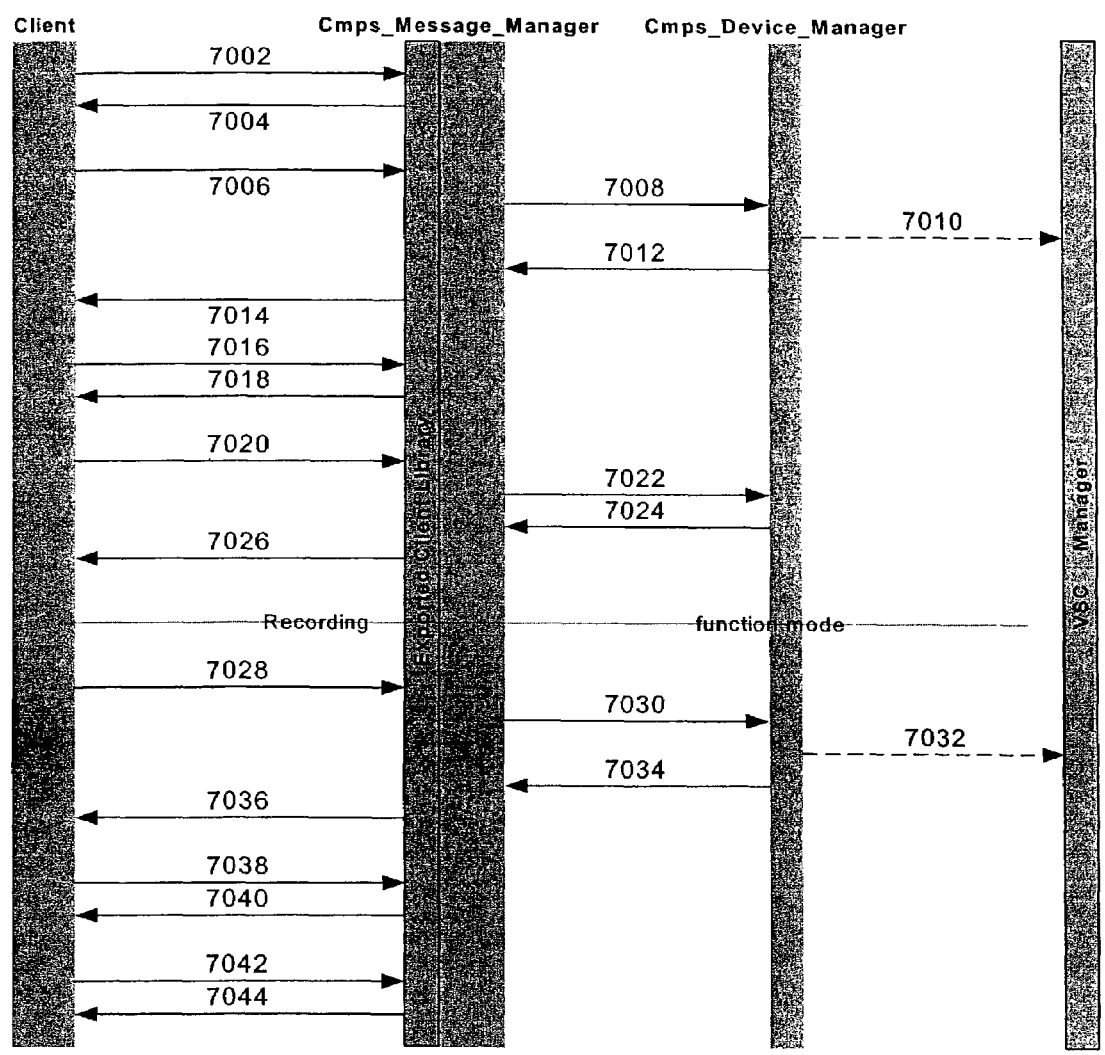
FIG. 17 is an illustration of the flow of commands between different components of the content management and protection system.

FIG. 17 illustrates the creation and management of a new recording session. In this figure, steps 7002 to 7026 correspond to messages exchanged between the elements of the CMPS system and elsewhere, as indicated in the following description.

In step 7002 the client sends a request to open a recording session, which is then duly opened by the device manager thread. An appropriate acknowledgement, containing a unique session identifier ('SessionID'), is returned by the CMPS message manager in step 7004. All subsequent communications relating to this session contain this session identifier.

In step 7006 the client sends a request to the CMPS message manager to open a recording sequence within the recording session. In step 7008 the CMPS message manager requests a file identifier ('file ID') from the CMPS device manager. The CMPS device manager then starts a recording session at the VSC Manager, as illustrated by step 7010. In step 7012 the CMPS device manager acknowledges to the CMPS message manager the request to obtain a file ID. Subsequently, in step 7014, an acknowledgement is sent from the CMPS message manager to the client that a recording sequence has been opened.

In step 7016, the client causes the CMPS message manager to obtain from the virtual machine the part of the PMT table of the programme being stored which relates to the ECMs. In step 7018 it is confirmed to the client that this has been carried out successfully.

A request to commence actual recording of content is sent by the client in step 7020. The CMPS message manager then sends (step 7022) a corresponding request to the CMPS device manager. The latter acknowledges this request to the former in step 7024, and in step 7026 the CMPS message manager acknowledges the request made by the client.

The recording proper then begins, with further messages being repeatedly transmitted between the CMPS, HDVR and other systems in the receiver/decoder until the recording proper ends. This recording 'loop' is described later with reference to FIG. 18. The further steps following the termination of this loop will first be described, still referring to FIG. 17.

At any time during recording the client may send a request to the CMPS message manager to end the recording proper (step 7028). In step 7030 the CMPS message manager notifies the CMPS device manager that recording should be ended, and in step 7032 the CMPS device manager notifies the VSC manager that the recording session should be closed. In step 7034 the CMPS device manager confirms to the CMPS message manager that the request to end recording has been carried out successfully. In step 7036 this is reported by the CMPS message manager to the client.

In step 7038 the client requests the CMPS message manager to close the recording sequence, and in step 7040 the latter confirms to the former that this has been done.

Finally, in step 7042 the client requests the CMPS message manager to close the recording session, and in step 7044 the CMPS message manager confirms to the client that this has been done.

Figure 18:
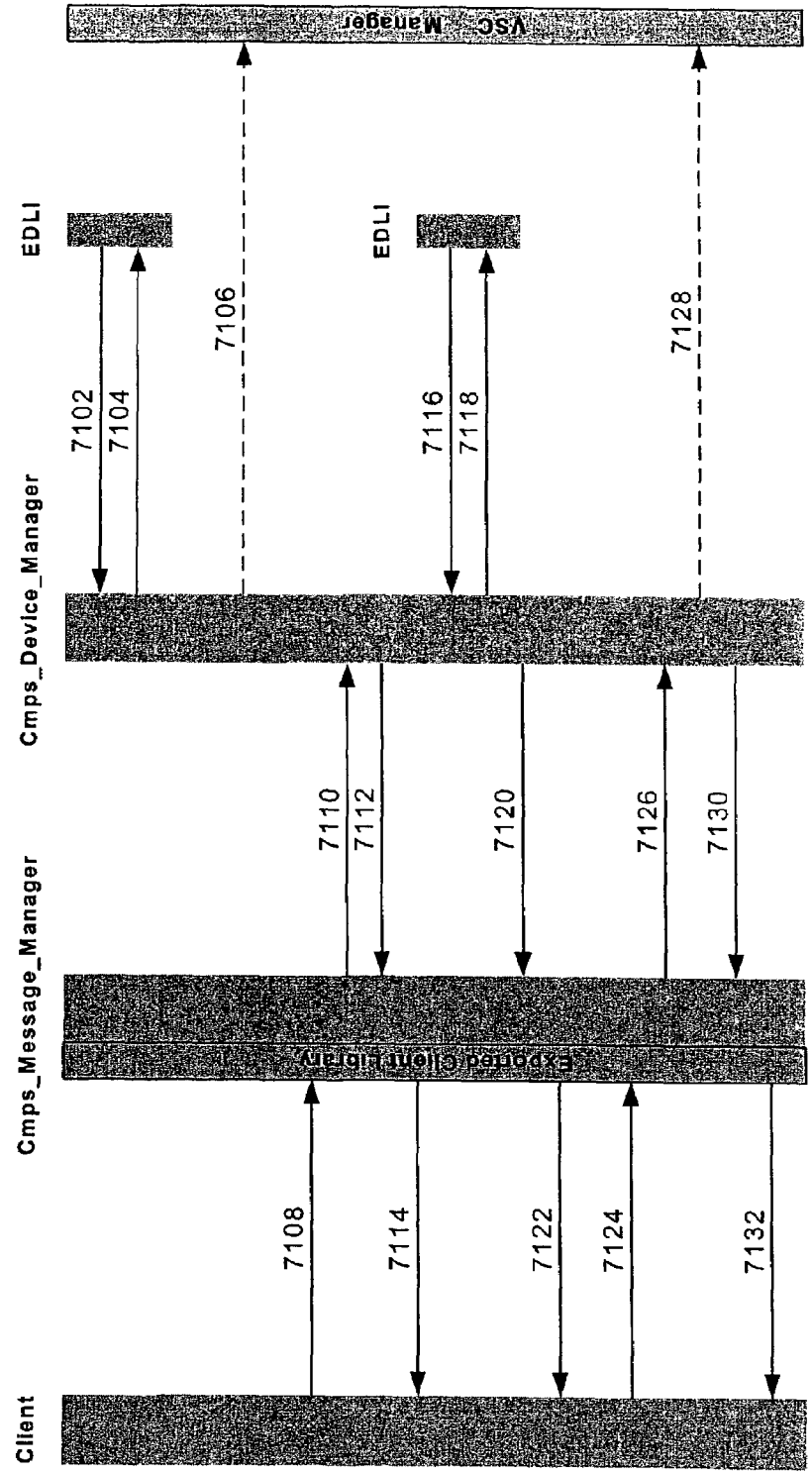
FIG. 18 is a further illustration of the flow of commands between different components of the content management and protection system.

Recording proper will now be described with reference to FIG. 18. In particular, steps 7102, 7104 and 7106 show the core of the recording 'loop': in step 7102, the next ECM extracted by the MLOAD device is delivered by the EDLI to the resource manager in the device manager thread 2320. The resource manager then sends the ECM to the LCARD device (providing access to the conditional access smartcard), and receives in return the decoded control words back from the LCARD device (again using the EDLI as intermediary). In step 7104, the control words thus obtained are forwarded to the middleware (via EDLI again) to allow, if appropriate, the live descrambling of the corresponding content (as well as the creation of CMMs as described below). In step 7106, the control words are forwarded to the VSC manager to allow CMMs to be created for other recording sessions as appropriate.

In step 7108 the client sends a request to the CMPS message manager to start recording for the present recording session. A corresponding request is sent, in step 7110, from the CMPS message manager to the CMPS device manager. In step 7112 the CMPS device manager acknowledges the request to the CMPS message manager, which acknowledges in step 7114 the request made by the client to start recording, and confirms that this has been started. Steps 7116, 7118 involve, as before, the reception from the MLOAD device of the next ECM (step 7116), the decoding of the ECM by the conditional access smartcard (not shown), and the return of the control words to other interested parties (step 7118). In step 7120 the CMPS device manager notifies the CMPS message manager that a new ECM section has been received from the EDLI. In step 7122 this is reported by the CMPS message manager to the client.

In step 7124 the client sends a request to the CMPS message manager for the new CMM. In step 7126 the CMPS message manager sends this request to the CMPS device manager. Subsequently, in step 7128 a command is sent to the VSC manager to create a CMM (with control words and other relevant information supplied by the resource manager in the device manager thread 2320 with the command), and the CMM is returned to the device manager by the VSC manager (not shown). In step 7130 the CMPS device manager acknowledges to the CMPS message manager that the CMM has been obtained, and this is confirmed to the client in step 7132.

The exchange of messages for a player session follow broadly the same structure as the messages described above, with a series of initial messages to open the player session, a main 'loop' of messages to handle the transfer of CMMs to the CMPS (the control words then being set directly by the virtual smartcard as described elsewhere), and a final exchange of messages to close the session. Accordingly, the messages for the player session will not be described further here.

Virtual Smartcard

The virtual smartcard (VSC) 2400 referred to earlier is a software emulation of functions of the CMPS smart card which can be inserted into the RCARD device 3442.

The VSC provides the following functionality:

Creation of a CMM from an ECM

Extracting content from a CMM

Returning control words extracted from CMMs

Generating session keys

Encrypting and decrypting messages with the aid of session keys

Generating control words (where local rescrambling is to be performed)

The VSC emulates in software these basic functions of the CMPS smart card using a cryptographic library located in the middleware of the receiver/decoder. This cryptographic library is provided as a separate module in the virtual machine, but in variants of the preferred embodiment is provided in the VSC manager itself, or in other parts of the receiver/decoder or attached cryptographic smartcard(s). The host processor and associated memory are used to emulate the onboard processor and memory of a real smart card. In the preferred embodiment, the resource manager module 2370 of the CMPS device manager thread 2320 communicates with the VSC manager, which in turn communicates with the VSC. The resource manager 2370 then communicates with the message manager as appropriate to return results to other parts of the system.

The VSC contains three unique keys for encryption, signature verification and session generation respectively. In the preferred embodiment, these keys are generated as and when required, in response to the first request to open session. In variants of the preferred embodiment, these keys are created earlier, at the time of the creation of the VSC (on initialisation of the receiver/decoder after a reboot, for example).

When a CMPS smartcard is present, the above keys are obtained from the CMPS smartcard by the CMPS system. Alternatively, as discussed later, the keys are generated using effectively random properties of the receiver/decoder.

The manner in which the VSC 2400 performs the CMM-related functions listed above will now be briefly described.

The VSC creates CMMs from two data components which it receives from the CMPS resource manager thread 2320 via the VSC manager 2350. The first component contains public information; the second contains the control words extracted from the ECMs or the ECM itself (see the description later relating to FIG. 24). In a variant of the preferred embodiment, the second component also contains data extracted from the URMs.

The VSC concatenates the two components and then calculates a cryptographic signature with reference to the concatenated components; this signature is appended to the message (along with a number of bytes of padding, if required, to make the message a uniform length) before the payload (that is the control words and/or ECM, the signature and the padding) is encrypted. In the preferred embodiment, the CBC-MAC cryptographic technique is used to calculate and verify signatures on messages, which signatures are created in dependence on the message itself and a shared symmetric key.

During playback, the VSC 2400 extracts the control words (or ECM) from the CMMs passed to it by a client via the CMPS threads by decrypting the payload, removing the padding and validating the decrypted message (and public information) using the attached signature. The extracted control words are then loaded directly into the descrambler by the VSC using the control word device 3760. In a variant of the preferred embodiment, key handles (key IDs) are returned to clients for the purpose of referencing in ambiguous situations.

In a variant of the preferred embodiment, the VSC creates and stores tables containing the information transmitted in the form of URMs, instead of storing information from the URMs in the CMMs themselves as described above. This information includes a file identifier, and the rights and restrictions associated with it (extracted from the URMs). When a user wishes to playback a stored programme, the rights and restrictions associated with that programme may be accessed without reading the content data itself from storage device.

Virtual Smartcard Manager

The VSC manager 2350 encapsulates the functionality of the CMPS smartcard, be it in the form of a virtual smartcard (the VSC) or a real smartcard (as represented by the RCARD device). The VSC manager thus (amongst other things) performs a routing function, but also performs certain managerial functions. The VSC manager also defines the messages which may validly be sent to the VSC.

In accordance with its routing role mentioned above, the VSC manager provides functions for determining whether to use the real smart card or the VSC for a particular task (in the preferred configuration where both a virtual CMPS smartcard and real CMPS smartcard are provided). This decision may be made dependent upon a characteristic or characteristics of the receiver/decoder (including the load upon it) and/or of the content data being processed. For example, the content may be relatively commercially valuable such that it is desirable to benefit from the better security afforded by a real smart card, or it may be such that the more rapid processing afforded by the VSC is required.

High-level functions provided by the VSC manager include a creator function for creating a VSC instance, a destructor for destroying the VSC (releasing the resources allocated to the VSC), and a query function for determining whether the VSC module currently exists. In the preferred embodiment, only one virtual smartcard can exist at any time, but in variants of the preferred embodiment, multiple instances are possible.

Lower-level functions provided by the VSC manager (which are mirrored by the VSC and/or real CMPS smartcard) include functions for creating, copying, destroying, storing, loading and deleting data objects; encryption and decryption functions, and functions for constructing the CMM as described above, including generating and using the signature and adding and removing packing; and functions for generating random numbers and generating and/or deriving keys, as will be described in more detail later.

The VSC manager also provides functions for the creation and destruction or sessions between the device manager thread 2320 and the VSC. Each new session is allocated a unique identifier (a 'SessionID') at the time of creation, and messages passed to the VSC manager subsequently specify the SessionID of the session to which they relate. These sessions are distinct to (but similar to) the sessions used for communication between the CMPS and a client, described earlier. In contrast to these CMPS-client sessions, a total of three session types are provided: recorder, player and management sessions. Of these, recorder and player sessions are typically only created during the corresponding recorder and player sessions between the CMPS and client.

In more detail, the recorder sessions are used for the creation of messages for local control (that is, CMMs) for storage together with programme data. Player sessions are used during playback of recorded content; the functions used during these sessions include those relating to the extraction of control words from CMMs sent to the VSC by a client (for example the HDVR) and their insertion into the descrambler via the CW device. In a variant of the preferred embodiment, the control words are forwarded to other entities, such as digital televisions with descrambling capabilities or the HDVR in charge of loading control words, using a secure authenticated channel.

In a management session, the basic functions of the VSC are available: that is, functions such as the creation of pseudo-random number sequences, and so on. The functions concerning the processing of CMMs are not available in a management session.

Communication between the VSC manager and the VSC or real CMPS smart card is required to be secure. A master session key is used for this purpose. As described later in the section relating to the generation of keys, the master session key may be diversified with a SessionID in order to derive different session keys where more than one is required. This master session key may also be used to establish secure communication with the HDVR, for example, in the embodiment in which control words are passed to the HDVR which is responsible for passing them to the CW device 3760.

It should also be noted that the VSC and the VSC manager have been described and illustrated (in FIG. 16) as forming part of the CMPS device manager thread; however, they may be provided elsewhere within the CMPS system as appropriate.

Key Generation

Figure 19:
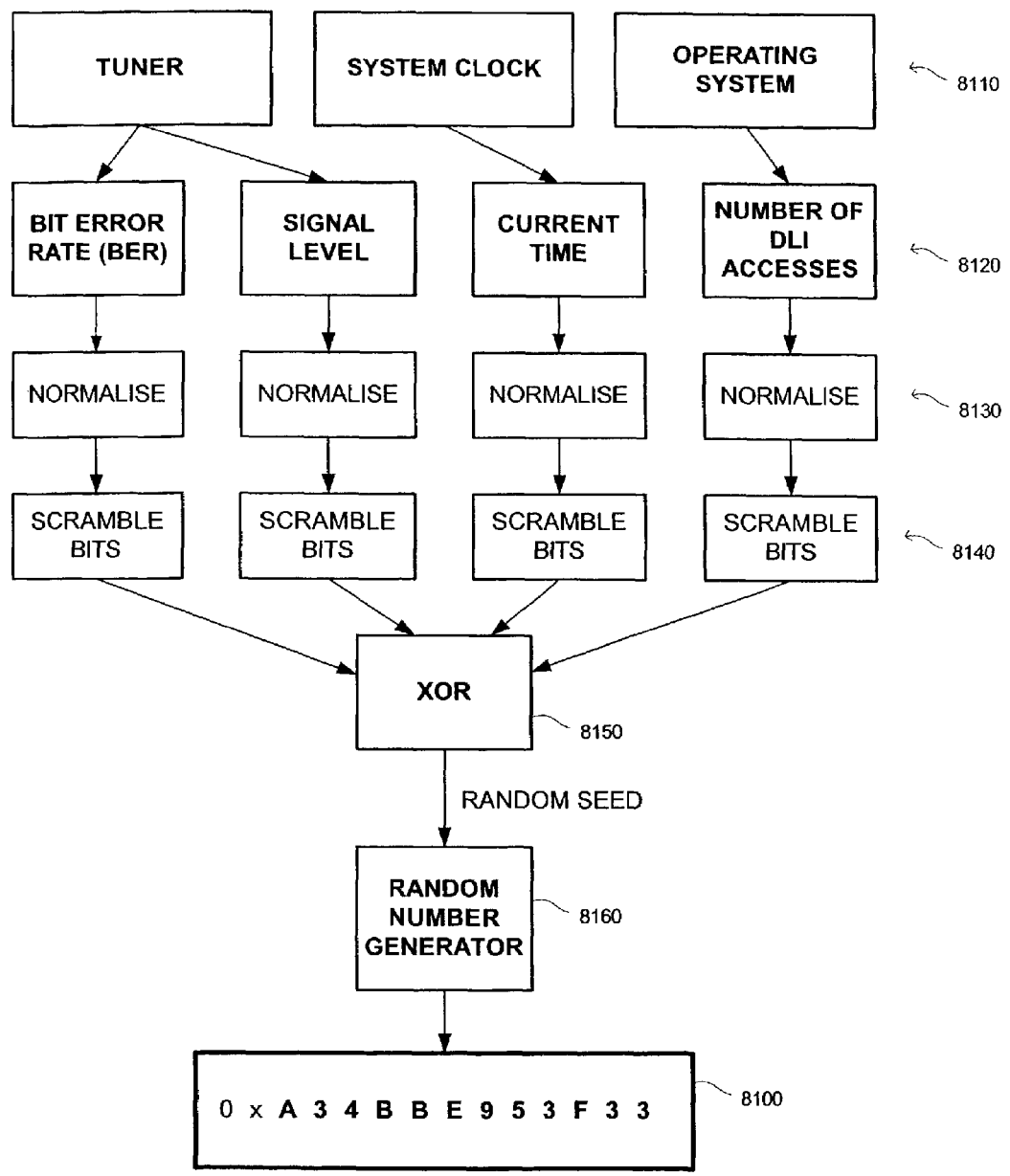
FIG. 19 is a schematic of a system for generating an encryption key using a random number generator.
Figure 20:
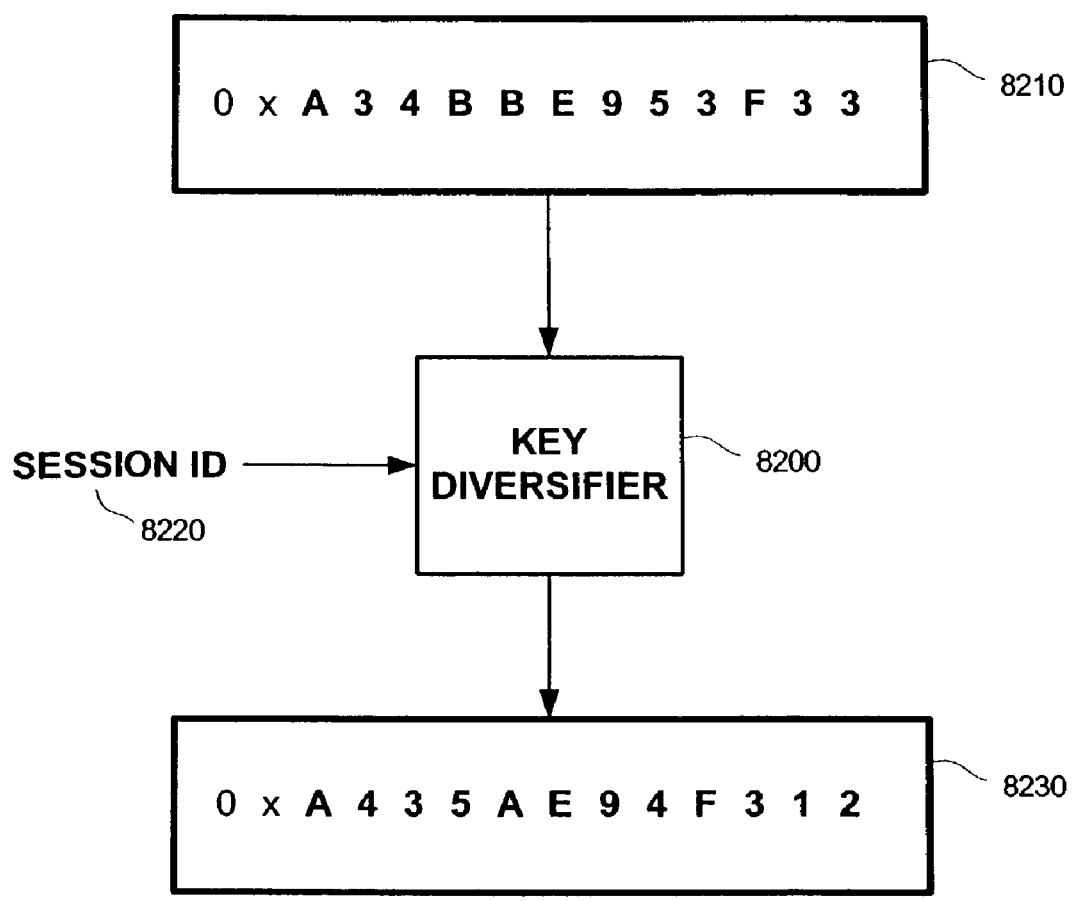
FIG. 20 is a schematic of a system for generating an encryption key using a key diversifier.

With reference to FIGS. 19 and 20, the various means for generating keys will now be described.

As mentioned above, in the preferred embodiment, various keys are generated either by the manipulation of a random number generator, or by diversifying known keys.

FIG. 19 shows the former process, in which a new master session key 8100 is created. Various elements 8110 of the receiver/decoder (in this case, the tuner, system clock and operating system) and various measurable properties 8120 of these elements (such as the average bit error rate of the tuner, the signal level of a given signal, the current system time and the number of accesses made to the device layer interface since the last reset) are shown, in addition to a bank of normalising filters 8130, a bank of bit scramblers 8140, an exclusive-or operator (XOR) 8150, and a random number generator 8160.

The properties 8120 of the elements 8110 are chosen, wherever possible, in their capacity as effectively random and/or unpredictable values, preferably varying over time. Where appropriate, each property 8120 is then normalised to the same bit width as the random seed (in other words, to create a 32 bit number for a 32 bit random seed, as is the case in the preferred embodiment) so that no property can dominate.

Subsequently, the normalised value of each property is then scrambled by the bit scramblers, which effectively swap round different bits of the values for each property, in a way which differs from property to property. If the unpredictability of the measured properties is confined to only a few lower-order bits, for example, the bit scrambling will effectively distribute this unpredictability throughout the 32 bit space.

Finally, the exclusive-or operator combines the first bit-scrambled value with the second, and then combines the result with the third bit-scrambled value and so on.

The random seed thus created is then fed into the random number generator, which then produces the desired encryption key with the desired bit length (by appending any number of fixed length random numbers if required).

In variants of the preferred embodiment, some or all of the normalising, bit scrambling and exclusive-or stages are absent, in some cases replaced with a different method entirely for combining the properties, such as simply summing them, for example.

In FIG. 20, a key diversifier 8200 is shown, as well as its inputs of a typical master session key 8210, a session ID 8220, and its output of a derived session key 8230.

Essentially the key diversifier uses a formula which takes advantage of the properties of strong cryptographic keys (that is, typically making use of various properties of prime numbers) to manipulate the master session key 8210 in dependence on the session ID 8220 to create a session key 8230 unique to that session. It follows as a constraint on the key diversifier that substantially all different session ID inputs will generate a unique session key 8230, and the session key 8230 is strong enough that cryptoanalysis of it will not easily yield the master session key 8210.

It is also worth noting that the elements shown in FIGS. 19 and 20 are illustrative, and do not necessarily correspond to actual physical devices. In fact, in the preferred embodiment, the normalising and bit scrambling functions, exclusive-or operation and random number generation are all carried out by the host processor 2002 mentioned earlier. In variants of the preferred embodiment, at least one further processor carries out certain of these functions in order to reduce the load on the host processor.

Key Storage

Figure 21:
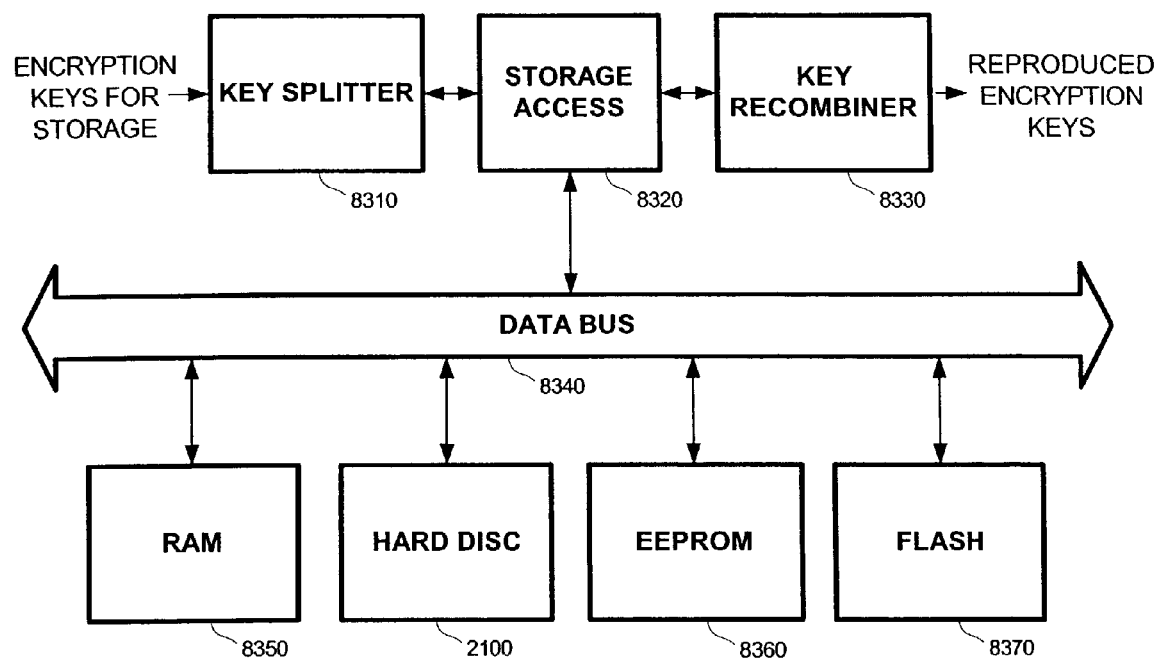
FIG. 21 is a schematic of a system for storing and retrieving encryption keys.

With reference to FIG. 21, the means for securely storing and reproducing encryption keys will now be described.

In FIG. 21, a key splitter 8310, storage access device 8320, and key recombiner 8330 are shown, as well as a data bus 8340 which connects the storage access device 8320 with a conventional RAM element 8350, hard disk unit 2100, EEPROM element 8360 and FLASH RAM element 8370.

To store an encryption key, for example, the key is fed into the key splitter 8310, which chops the key into an appropriate number of portions having a certain number of bits each. In the preferred embodiment, the portions all have the same size of 8 bits (one byte) for convenience, but in variants of the preferred embodiment, the portions have smaller and/or larger sizes, and also may have different sizes with respect to each other. Sizes of less than 8 bits are generally less convenient to manipulate, but can offer improved security.

The portions of the key are then stored by the storage access device 8320. In practice, this device comprises the various software devices which are responsible for communicating with the various storage devices 8350, 2100, 8360, 8370, such as the mass storage device 3728 (for the hard disk), and so on.

In the preferred embodiment, the exact choice of locations (comprising storage device and address in storage device) in which to store the portions is generated by the storage access device in dependence on a key identifier (limited to, for example, 8 bits) which is supplied by the invoking process. Each location and destination device needs to be unique to a particular key identifier, to avoid the overwriting of portions of different keys. In the preferred embodiment, an appropriately complex formula is used to calculate each storage location on the fly in dependence on the key identifier and portion number. In a variant of the preferred embodiment, various tables (generated when the VSC is initialised or reinitialised) are used to keep track of the storage locations, and each separately stored portion of the stored key may also be encrypted as it is stored with a key derived from the key identifier and/or portion number.

The corresponding process of reading the key is initiated by a command from the invoking process specifying the key identifier, which causes the storage access device to first calculate the storage locations (as described above), and then load all of the key portions.

The key portions are then forwarded to the key recombiner 8330, which reassembles the key and outputs it to the invoking process.

A further improvement to the above methods for key storage is the randomisation of memory in which the portions of keys are to be stored (and preferably the randomisation of further memory in which they will not be stored). Since encryption keys may often be detected on account of their apparent randomness, this can reduce the possibility of keys being reassembled by pirates, for example.

Figure 22:
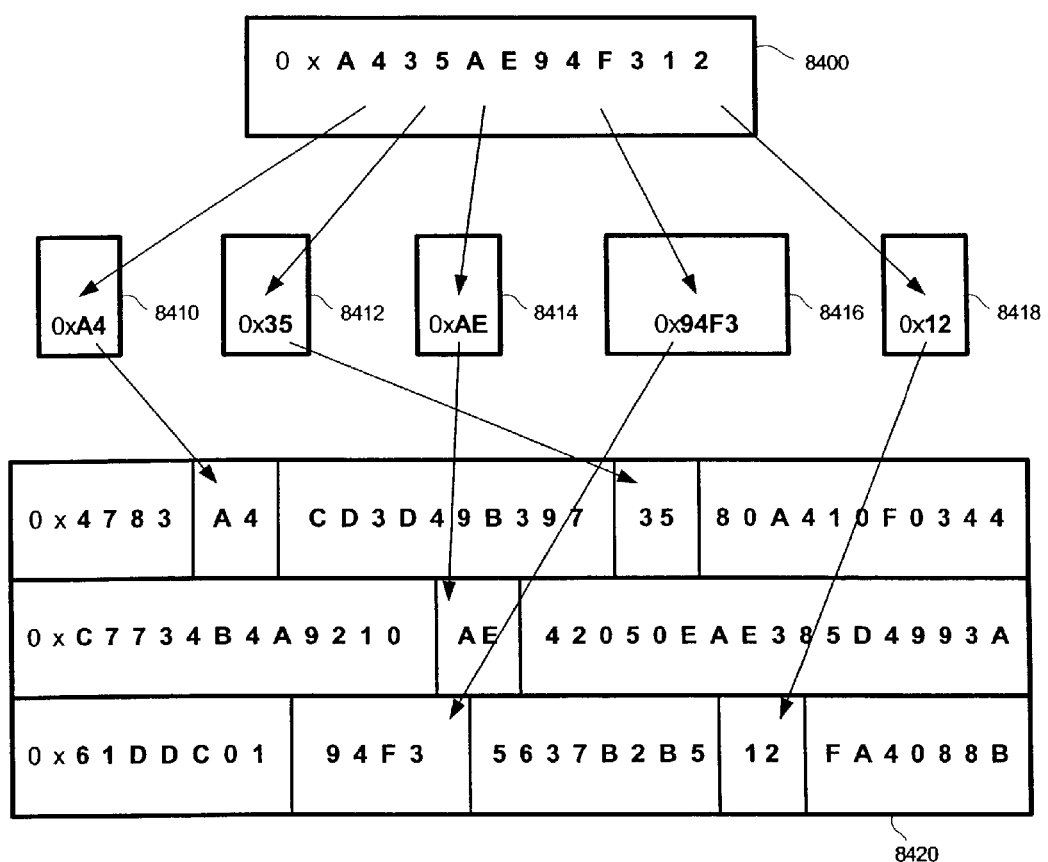
FIG. 22 is an illustration of the process of storing an encryption key in accordance with the above system.
Figure 23:
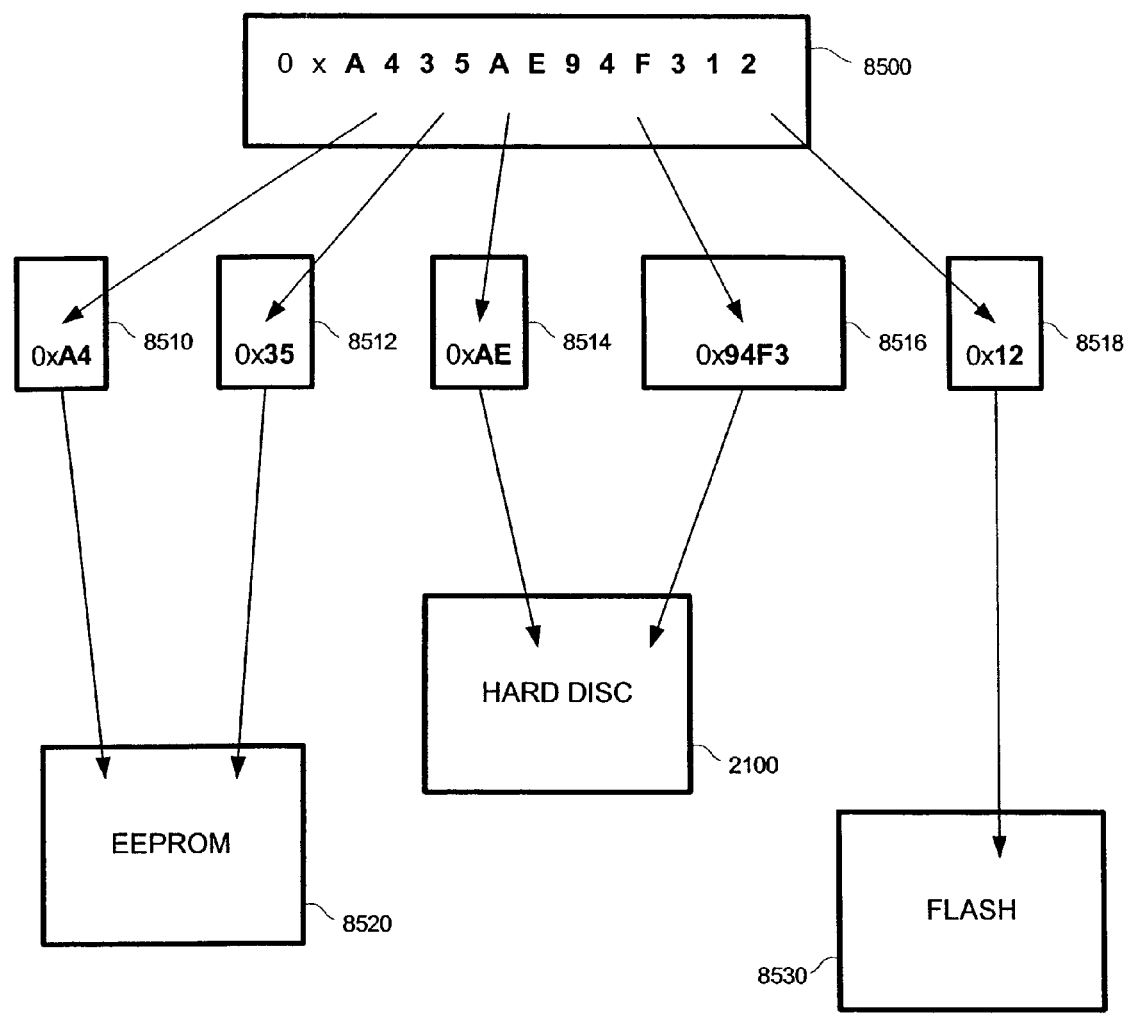
FIG. 23 is a further illustration of the process of storing an encryption key.

FIGS. 22 and 23 illustrates the operation of the key storage mechanism in more detail.

FIG. 22 shows a 48-bit encryption key 8400 (here shown in hexadecimal format), key portions 8410, 8412, 8414, 8416, 8418, and a randomised memory area 8420, and illustrates the splitting of the key 8400 into constituent portions (in this case of unequal sizes), and the storage of these portions in the randomised memory area 8420 in the locations indicated.

FIG. 23 illustrates the storage of the same key using more than one device (in contrast to the example shown in FIG. 22 which uses only one memory area).

In FIG. 23, a 48-bit encryption key 8500, its constituent portions 8510, 8512, 8514, 8516, 8518, and an EEPROM element 8520, hard disc unit 2100 and flash RAM element 8530 are shown. Here, the allocation of different portions 8510, 8512, 8514, 8516, 8518 to different devices 8520, 2100, 8530 is illustrated.

Encapsulation of ECMs in CMMs

Figure 24:
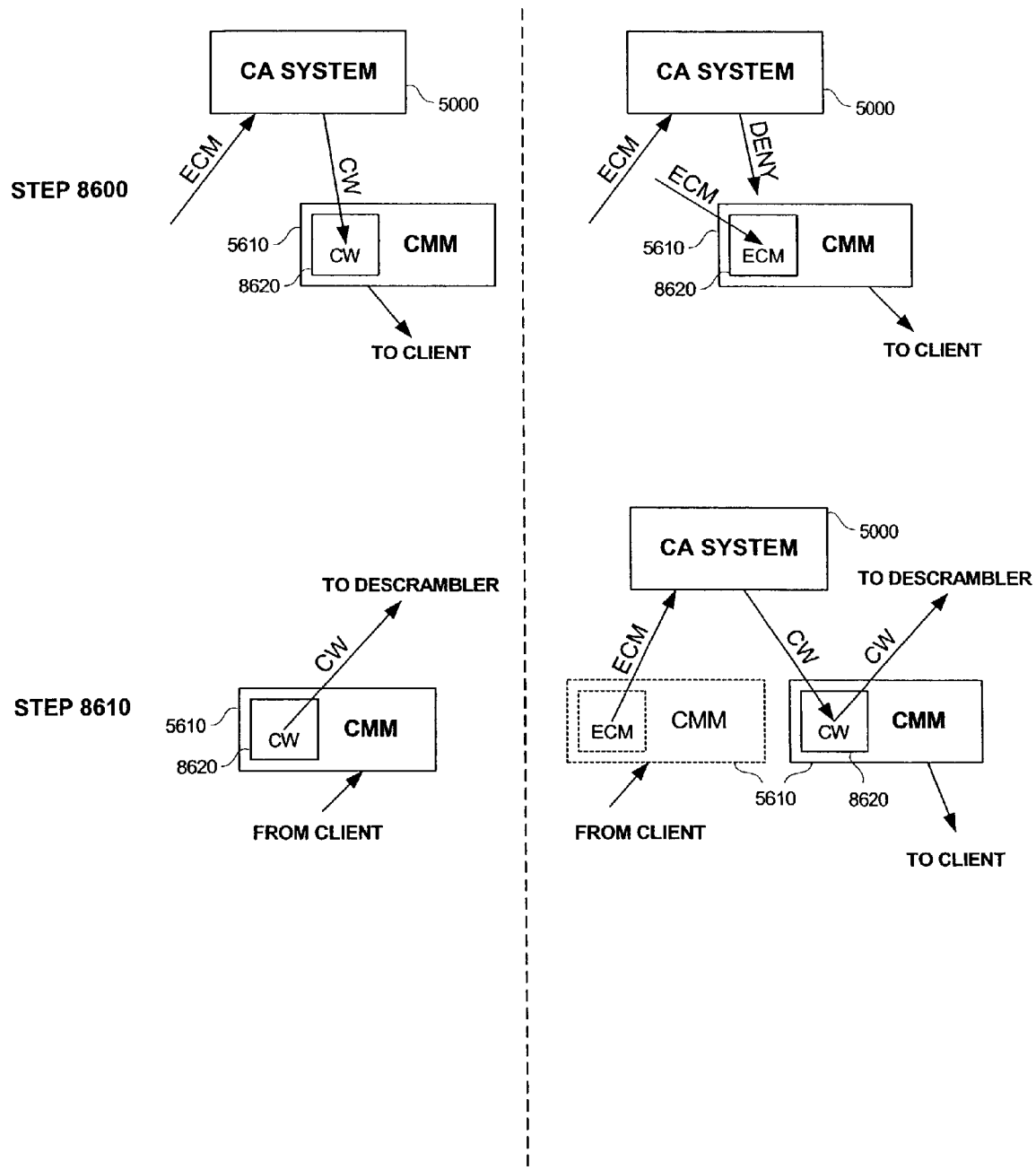
FIG. 24 is an illustration of the encapsulation of an Entitlement Control Message (ECM) in a Content Management Message (CMM).

With reference to FIG. 24, the encapsulation of ECMs in CMMs will now be described in more detail.

FIG. 24 shows a CMM creation step 8600 and a content playback step 8610, in a first and second case (left side and right side of the dotted line respectively). In the various scenarios, a conditional access system 5000, CMM 5610 and a key field 8620 in the CMM are shown.

In the first step 8600, the user is recording a content (such as a television programme) for which at least one CMM is required. In both cases, the relevant ECM for the given CMM 5610 is requested as per usual.

The first case illustrates the situation where the user has been granted the access rights to view the content for which the CMM is required. In this case, the conditional access system 5000 returns to the CMPS system the control words contained in the ECM, and the relevant field 8620 of the CMM is filled with the control words.

In the second case, however, the user does not have the access rights for the content which is being recorded. In response to the DENY signal from the conditional access system 5000, the relevant ECM is stored in the field 8620 usually reserved for the decrypted control words. At this point, the user will not be able to view the content, and for as long as the access rights continue to be denied, the CMM will not function as intended. In order to encapsulate the ECM within the CMM, the Resource Manager 2370 passes the ECM, rather than control words, to the VSC 2400 via the VSC manager 2350 as a parameter to a request for creation of a CMM during the procedure described above with reference to FIG. 11.

In the second step 8610, the user is attempting to play back the content recorded earlier during step 8600. By now, it is assumed where the access rights for the content were previously missing, they have now been properly obtained. In accordance with the normal functioning of the CMPS system, the client (typically the HDVR system) forwards the CMM to the CMPS system for processing.

In the first case, the CMPS system extracts the control words from the relevant field 8620 in the CMM 5610 as usual and autonomously feeds the control words to the descrambler (not shown) to allow the content to be viewed.

In the second case, the CMPS system extracts the ECM from the CMM 5610 and forwards it again to the conditional access system 5000. In the event of a further failure to decrypt, the CMPS system would report a failure and attempt the same during future attempts to play back the content. This time, however, the decryption is successful. The control words are passed to the descrambler 2010, to enable it to descramble the content, and to the VSC, which uses them to generate a new CMM 5610, which is sent to the client for storage as described above.

It should be noted that the system described above can also be applied to other forms of data other than ECMs and control words. Furthermore, whilst the second step 8610 has been described as operating during the play back of the content in question—which has the advantage that the validation of the CMMs is performed on the fly—it can also operate 'in the background' at any other time, for example during the early hours of the morning, or in response to the receipt of an EMM granting the appropriate rights.

Encapsulation of ECMs in CMMs can also provide a degree of independence between the HDVR and the conditional access systems. This is particularly useful if more than one conditional access system is provided in the receiver/decoder, for example. In this case, as before, the CMPS may embed ECMs from the various conditional access systems until one of them receives the appropriate rights, allowing the ECM to be resolved.

The precise details of the implementation of the various functions described above, and their distribution between hardware and software, are a matter of choice for the implementor and will not be described in detail. It is, however, noted that dedicated integrated circuits capable of performing the operations required in the receiver/decoder are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available.

The modules and other components have been described in terms of the features and functions provided by each component, together with optional and preferable features. With the information given and specifications provided, actual implementation of these features and the precise details are left to the implementor. As an example, certain modules could be implemented in software, preferably written in the C programming language and preferably compiled to run on the processor used to run the application; however, some components may be run on a separate processor, and some or all components may be implemented by dedicated hardware.

The above modules and components are merely illustrative, and the invention may be implemented in a variety of ways, and, in particular, some components may be combined with others which perform similar functions, or some may be omitted in simplified implementations. Hardware and software implementations of each of the functions may be freely mixed, both between components and within a single component.

It will be readily understood that the functions performed by the hardware, the computer software, and such like are performed on or using electrical and like signals. Software implementations may be stored in ROM, or may be patched in FLASH.

It will be understood that the present invention has been described above purely by way of example, and modification of detail can be made within the scope of the invention.

Each feature disclosed in the description, and (where appropriate) the claims and drawings may be provided independently or in any appropriate combination.

What is claimed is:

1. A method for processing data, comprising:
   receiving a scrambled program and encrypted data comprising a payload, wherein a user does not initially have access rights to access the payload;
   storing the encrypted data with the scrambled program; and
   when the user obtains access rights to access the payload:
      decrypting the encrypted data, wherein a stored copy of the encrypted data is read for the decryption,
      extracting the payload from the encrypted data to obtain an extracted payload, wherein the payload comprises at least one control word used to descramble the scrambled program,
      generating an encryption key to encrypt the extracted payload using a master session key, wherein the master session key is divided into a plurality of portions to obtain a divided key, and wherein each of the plurality of portions of the divided key is stored in a plurality of different locations, and
      subsequently replacing the stored encrypted data with the extracted payload, so that the extracted payload and the scrambled program are stored after the user obtains access rights to access the payload.

2. The method of claim 1, further comprising:
   sending the encrypted data to a smartcard, wherein the smartcard is configured to decrypt the encrypted data and extract the payload to obtain an extracted payload, if the smartcard comprises access rights to access the payload; and
   receiving a response from the smartcard indicating the encrypted data cannot be decrypted, if the smartcard does not comprise access rights to access the payload; and
   receiving the extracted payload and the scrambled program from the smartcard, if the smartcard comprises access rights to access the payload.

3. The method of claim 1, further comprising:
   at least one of storing data and reproducing data, the payload being related to the data.

4. The method of claim 1, further comprising:
   encapsulating a first encrypted data object comprising the encrypted data within a second encrypted data object.

5. The method of claim 1, further comprising:
   encrypting the extracted payload with an encryption key.

6. The method of claim 5, further comprising:
   authenticating the extracted payload with an authentication key.

7. The method of claim 1, further comprising:
   establishing at least one session and associating the at least one session with a session identifier.

8. The method of claim 1, wherein the master session key is used to generate an authentication key for authenticating the extracted payload.

9. The method of claim 8, wherein the authentication key and the encryption key are associated with a session and a session identifier associated with the session.

10. The method of claim 9, wherein the authentication key is used to authenticate a further session.

11. The method of claim 9, wherein the encryption key is used to encrypt a further session.

12. The method of claim 8, wherein at least one selected from the group consisting of the master session key, the encryption key, and the authentication key is divided into a plurality of portions to obtain a divided key, and wherein each of the plurality of portions of the divided key is stored in a plurality of different locations.

13. The method of claim 12, further comprising:
    reading data associated with the divided key from each of the plurality of different locations; and
    combining the data read from each of the plurality of different locations to obtain a cryptographic key.

14. The method of claim 3, wherein the means for storing is configured to store at least in part in a receiver/decoder.

15. The method of claim 11, further comprising:
    measuring at least one property selected from the group consisting of a random property, an unpredictable property, a time-varying property, and a geographically-varying property; and
    generating the divided key in dependence on the at least one property.

16. The method of claim 1, wherein the encrypted data comprises at least one entitlement control message (ECM).

17. A receiver/decoder operatively connected to a mass storage device, wherein the receiver/decoder is configured to perform a method for processing data, the receiver/decoder comprising:
    a memory configured to store encrypted conditional access data with a scrambled program;
    a processor configured to execute the method for processing data, the method comprising:
       receiving the scrambled program and the encrypted conditional access data comprising a conditional access data payload, wherein a user does not initially have access rights to access the payload;
       when the user obtains access rights to access the conditional access data payload:
       decrypting the encrypted conditional access data, wherein a stored copy of the encrypted data is read for the decryption,
       extracting the conditional access data payload from the conditional access data to obtain an extracted payload, wherein the conditional access data payload comprises at least one control word used to descramble the scrambled program,
       generating an encryption key to encrypt the extracted payload using a master session key, wherein the master session key is divided into a plurality of portions to obtain a divided key, and wherein each of the plurality of portions of the divided key is stored in a plurality of different locations, and subsequently replacing the stored encrypted conditional access data with the extracted payload, so that the extracted payload and the scrambled program are stored after the user obtains access rights to access the payload.

18. The receiver/decoder of claim 17, wherein the encrypted conditional access data comprises at least one entitlement control message (ECM).

19. The receiver/decoder of claim 18, wherein the at least one control word is produced by a smartcard from the at least one ECM.

20. The receiver/decoder of claim 17, further comprising: authenticating the extracted payload with an authentication key.

* * * * *

UNITED STATES PATENT AND TRADEMARK OFFICE
CERTIFICATE OF CORRECTION

PATENT NO. : 7,590,860 B2 Page 1 of 1
APPLICATION NO. : 10/295021
DATED : September 15, 2009
INVENTOR(S) : Leporini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Twenty-first Day of September, 2010

David J. Kappos
*Director of the United States Patent and Trademark Office*